United States Patent
Koito et al.

(10) Patent No.: US 9,292,126 B2
(45) Date of Patent: Mar. 22, 2016

(54) DISPLAY DEVICE WITH TOUCH DETECTION FUNCTION, ELECTRONIC APPARATUS, AND TOUCH DETECTION DEVICE

(71) Applicant: Japan Display Inc., Tokyo (JP)

(72) Inventors: Takeo Koito, Tokyo (JP); Koji Ishizaki, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/208,645

(22) Filed: Mar. 13, 2014

(65) Prior Publication Data

US 2014/0292712 A1      Oct. 2, 2014

(30) Foreign Application Priority Data

Mar. 29, 2013   (JP) .................. 2013-075000

(51) Int. Cl.
*G06F 3/041*    (2006.01)
*G06F 3/044*    (2006.01)

(52) U.S. Cl.
CPC .............. *G06F 3/0416* (2013.01); *G06F 3/044* (2013.01); *G06F 3/0418* (2013.01)

(58) Field of Classification Search
CPC ...... H04N 13/0452; G09G 3/36; G06F 3/041; G06F 3/0412; G06F 3/0416; G06F 3/044; G06F 3/0488; G06F 2203/04101
See application file for complete search history.

(56) References Cited

U.S. PATENT DOCUMENTS

| | | | | |
|---|---|---|---|---|
| 8,144,295 | B2 * | 3/2012 | Chang et al. | 349/141 |
| 8,243,027 | B2 * | 8/2012 | Hotelling et al. | 345/173 |
| 2010/0182273 | A1 | 7/2010 | Noguchi et al. | |
| 2012/0242615 | A1 * | 9/2012 | Teraguchi et al. | 345/174 |

FOREIGN PATENT DOCUMENTS

| | | |
|---|---|---|
| JP | 2009-244958 | 10/2009 |
| JP | 2012-198416 | 10/2012 |
| TW | 201308149 A1 | 2/2013 |

OTHER PUBLICATIONS

Taiwanese Office Action issued Oct. 20, 2015 for corresponding Taiwanese Application No. 103110910.

* cited by examiner

*Primary Examiner* — Andrew Sasinowski
(74) *Attorney, Agent, or Firm* — Michael Best & Friedrich LLP

(57) ABSTRACT

According to an aspect, a display device with a touch detection function includes: a variable focus lens unit that includes a first substrate including a first electrode, a second substrate including a second electrode, and a variable focus layer that is provided between the first substrate and the second substrate; a display unit including a display region that displays an image via the variable focus lens unit; a drive electrode that is arranged in the display unit or at a position opposed to the display region, and divided into a plurality of pieces; and a touch detection unit configured to detect a position of a proximity object using one of the first electrode and the second electrode as a touch detection electrode based on change in capacitance with respect to the drive electrode.

14 Claims, 27 Drawing Sheets

DISPLAY DEVICE WITH TOUCH DETECTION FUNCTION, ELECTRONIC APPARATUS, AND TOUCH DETECTION DEVICE

CROSS-REFERENCE TO RELATED APPLICATIONS

This application claims priority from Japanese Application No. 2013-075000, filed on Mar. 29, 2013, the contents of which are incorporated by reference herein in its entirety.

BACKGROUND

1. Technical Field

The present disclosure relates to a display device with a touch detection function, an electronic apparatus, and a touch detection device that can detect an external proximity object, specifically, a display device with a touch detection function, an electronic apparatus, and a touch detection device that can detect the external proximity object based on a change in capacitance.

2. Description of the Related Art

In recent years, a touch detection device that can detect an external proximity object, what is called a touch panel, has been attracting attention. The touch panel is used for a display device with a touch detection function in a manner mounted on or integrated with a display device such as a liquid crystal display device. In the display device with a touch detection function, various button images and the like are displayed on the display device, so that information can be input using the touch panel instead of a typical mechanical button. The display device with a touch detection function having such a touch panel does not require an input device such as a keyboard, a mouse, and a keypad. Accordingly, use of the display device with a touch detection function tends to expand in a portable information devices such as cellular telephones as well as to computers.

Examples of type of touch detection include, but are not limited to, an optical type, a resistance type, a capacitive type, and the like. A capacitive touch detection device is used for portable devices and the like, has a relatively simple structure, and can achieve low power consumption. For example, Japanese Patent Application Laid-open Publication No. 2009-244958 describes a display device with a touch sensor (display device with a touch detection function) including a plurality of display pixel electrodes, a common electrode arranged in a manner opposed to the display pixel electrodes, a display function layer having an image display function, a display control circuit that applies a display voltage between the display pixel electrodes and the common electrode based on an image signal to perform image display control so that the display function of the display function layer is exhibited, and a touch detection electrode that is arranged in a manner opposed to or side by side with the common electrode and forms capacitance between itself and the common electrode.

Japanese Patent Application Laid-open Publication No. 2012-198416 (JP-A-2012-198416) describes a display device and an electronic apparatus including a pixel part having a plurality of pixels, a display switching functional part that displays an image based on light emitted from the pixel part and can switch three-dimensional display and two-dimensional display of the image, and a sensor unit configured to detect contact or proximity of an object.

The display device and the electronic apparatus disclosed in JP-A-2012-198416 allow a user to input information while displaying a three-dimensional video image and a two-dimensional video image in a switchable manner. According to JP-A-2012-198416, a drive electrode drives a touch sensor unit along with a liquid crystal lens unit, and a detection electrode and a drive electrode are formed on a front surface and a back surface of a substrate in a predetermined pattern, respectively.

However, in the display device and the electronic apparatus disclosed in JP-A-2012-198416, it is not considered that an electrode of the liquid crystal lens unit is used as the detection electrode for a touch detection function. In the display device and the electronic apparatus disclosed in JP-A-2012-198416, the detection electrode is provided on the front surface of the substrate and the drive electrode is provided on the back surface thereof. However, it is not considered that there is possibility that touch detection sensitivity or detection sensitivity of a lens surface will be decreased.

The present disclosure is made in view of such a situation, and provides means for achieving at least one of a first purpose and a second purpose. The first purpose of the present disclosure is to provide a display device with a touch detection function and an electronic apparatus including a variable focus layer in which a refractive index of transmitted light varies depending on a certain signal applied between a first electrode and a second electrode, and a touch detection unit configured to detect the position of a proximity object using one of the first electrode and the second electrode as a touch detection electrode.

The second purpose of the present disclosure is to provide a display device with a touch detection function and an electronic apparatus that include a variable focus layer in which a refractive index of transmitted light varies depending on a certain signal applied between a first electrode and a second electrode, and a touch detection unit configured to detect the position of a proximity object using one of the first electrode and the second electrode as a drive electrode, to improve detection sensitivity.

According to an aspect, a display device with a touch detection function includes: a variable focus lens unit that includes a first substrate including a first electrode, a second substrate including a second electrode, and a variable focus layer that is provided between the first electrode side of the first substrate and the second electrode side of the second substrate and in which a refractive index of transmitted light varies depending on a certain signal applied between the first electrode and the second electrode; a display unit including a display region that displays an image via the variable focus lens unit; a drive electrode that is arranged in the display unit or at a position opposed to the display region, and divided into a plurality of pieces; and a touch detection unit configured to detect a position of a proximity object using one of the first electrode and the second electrode as a touch detection electrode based on change in capacitance with respect to the drive electrode.

According to another aspect, a display device with a touch detection function includes: a variable focus lens unit that includes a first substrate including a first electrode, a second substrate including a second electrode, and a variable focus layer that is provided between the first electrode side of the first substrate and the second electrode side of the second substrate and in which a refractive index of transmitted light varies depending on a certain signal applied between the first electrode and the second electrode; a display unit including a display region that displays an image via the variable focus lens unit; a drive electrode that is arranged in the display unit or at a position opposed to the display region, and divided into a plurality of pieces; a touch detection electrode that is divided into a plurality of pieces; and a touch detection unit configured to detect a position of a proximity object using one of the first electrode and the second electrode as the drive electrode based on change in capacitance between the touch detection electrode and the drive electrode. Each of the first electrode and the second electrode is divided. A direction in which the first electrode extends is parallel to a direction in which the second electrode extends. A width of one of the first electrode and the second electrode to which a common potential for variable focus is applied is enlarged.

According to another aspect, an electronic apparatus includes the display device with a touch detection function.

According to another aspect, a touch detection device includes: a variable focus lens unit that includes a first substrate including a first electrode, a second substrate including a second electrode, and a variable focus layer that is provided between the first electrode side of the first substrate and the second electrode side of the second substrate and in which a refractive index of transmitted light varies depending on a certain signal applied between the first electrode and the second electrode; a drive electrode that is divided into a plurality of pieces; and a touch detection unit configured to detect a position of a proximity object using one of the first electrode and the second electrode as a touch detection electrode based on change in capacitance with respect to the drive electrode. When one of the first electrode and the second electrode serves as the touch detection electrode, the other one of the first electrode and the second electrode serves as the drive electrode.

SUMMARY

DETAILED DESCRIPTION

The following describes modes for implementing the present disclosure (embodiments) in detail with reference to drawings. The present disclosure is not limited by content of the embodiments described below. Components described below include a component that is easily conceivable by those skilled in the art and a substantially equivalent component. The components described below may be appropriately combined with each other. The description will be held in the following order.

Figure 1:
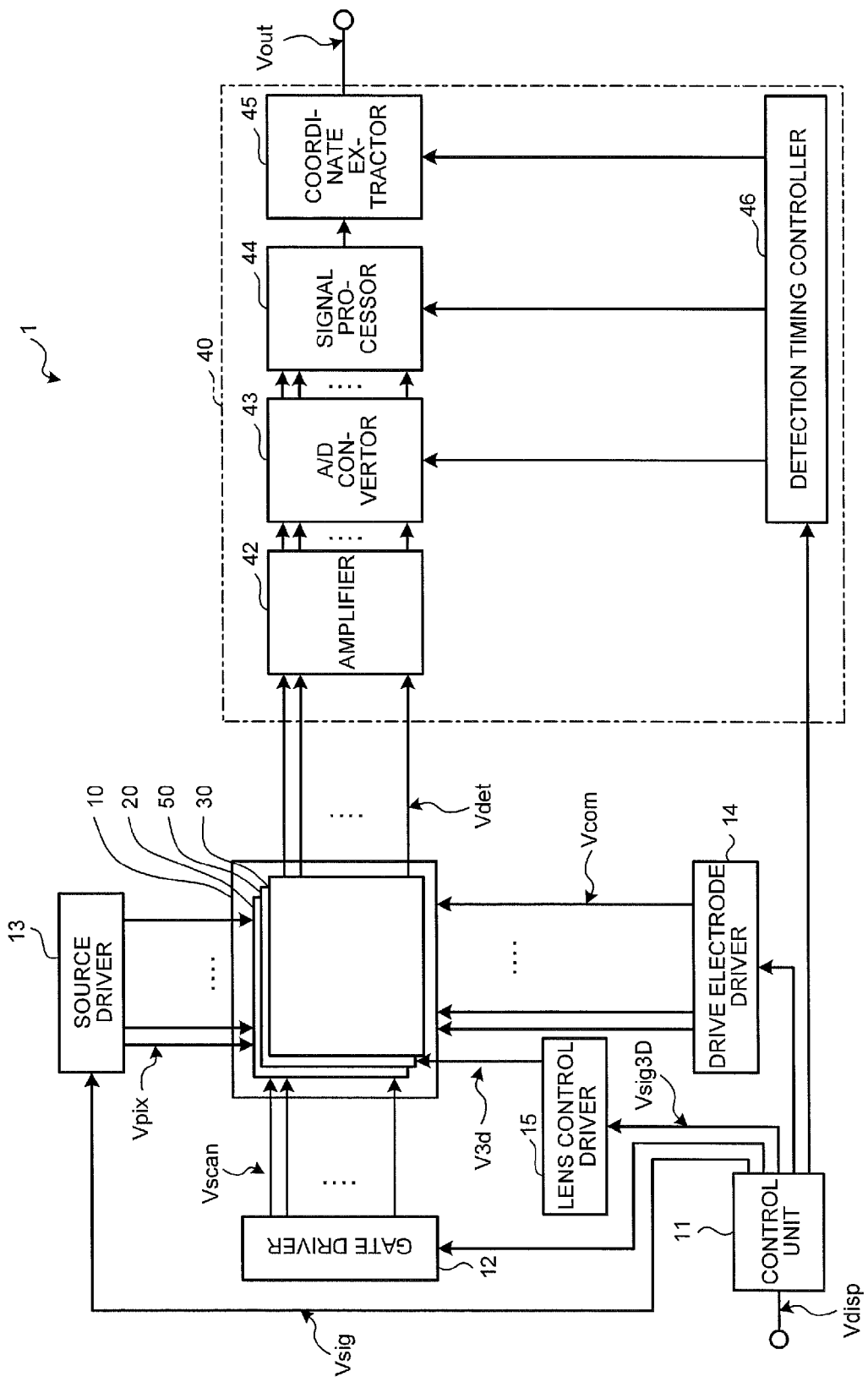
FIG. 1 is a block diagram illustrating a configuration example of a display device with a touch detection function according to a first embodiment.

1. Embodiments (display devices with a touch detection function)
   1-1. First embodiment
   1-2. Second embodiment
   1-3. Third embodiment
   1-4. Fourth embodiment
   1-5. Fifth embodiment
   1-6. Modification of embodiments
2. Application examples (electronic apparatus)
   Examples in which the display device with a touch detection function according to the embodiments is applied to an electronic apparatus
3. Aspects of present disclosure
1. Embodiments Display Devices with a Touch Detection Function
1-1. First Embodiment
Example of Overall Configuration FIG. 1 is a block diagram illustrating a configuration example of a display device with a touch detection function according to a first embodiment. A display device with a touch detection function 1 includes a display unit with a touch detection function 10, a control unit 11, a gate driver 12, a source driver 13, a drive electrode driver 14, a lens control driver 15, a touch detection unit 40, and a liquid crystal lens 50. The liquid crystal lens 50 is a variable focus lens unit that is arranged at a position opposed to a display region of a display unit 20 and changes a refractive index of light transmitted from the display unit 20 in accordance with a lens driving voltage that is a certain signal. The liquid crystal lens 50 can, for example, switch three-dimensional display and two-dimensional display of an image.

In the display device with a touch detection function 1, the display unit with a touch detection function 10 incorporates a touch detection function therein. The display unit with a touch detection function 10 is a device in which the display unit 20 using liquid crystal display elements as display elements is integrated with a capacitive touch detection device 30. The display unit with a touch detection function 10 may be a device in which the capacitive touch detection device 30 is mounted on the display unit 20 using liquid crystal display elements as display elements. The display unit 20 may, for example, be an organic electroluminescent (EL) display unit. The display unit 20 may, for example, be a display unit utilizing electrophoresis.

The display unit 20 is a device that performs display by sequentially scanning for each one horizontal line according to a scanning signal Vscan supplied from the gate driver 12. The control unit 11 is a circuit that supplies a control signal to each of the gate driver 12, the source driver 13, the drive electrode driver 14, the lens control driver 15, and the touch detection unit 40 based on a video signal Vdisp supplied from the outside so that they operate in synchronization with each other.

The gate driver 12 has a function of sequentially selecting one horizontal line serving as a display driving target of the display unit with a touch detection function 10 based on the control signal supplied from the control unit 11.

The source driver 13 is a circuit that supplies a pixel signal Vpix to each sub-pixel SPix (described later) of the display unit with a touch detection function 10 based on the control signal of an image signal Vsig supplied from the control unit 11.

The drive electrode driver 14 is a circuit that supplies a driving signal Vcom to drive electrodes COML (described later) of the display unit with a touch detection function 10 based on the control signal supplied from the control unit 11.

The touch detection unit 40 is a circuit configured to detect whether or not the touch detection device 30 is touched (in a contact state described later) based on a control signal supplied from the control unit 11 and a touch detection signal Vdet supplied from the touch detection device 30 of the display unit with a touch detection function 10, and obtains coordinates of a touched point in a touch detection region when touch is detected. The touch detection unit 40 includes an amplifier (a touch detection signal amplification unit) 42, an analog-digital (A/D) convertor 43, a signal processor 44, a coordinate extractor 45, and a detection timing controller 46.

The amplifier 42 amplifies the touch detection signal Vdet supplied from the touch detection device 30. The amplifier 42 may include a low-pass analog filter that removes a high-frequency component (noise component) included in the touch detection signal Vdet to extract and output each touch component.

Basic Principle of Capacitive Touch Detection

Figure 2:
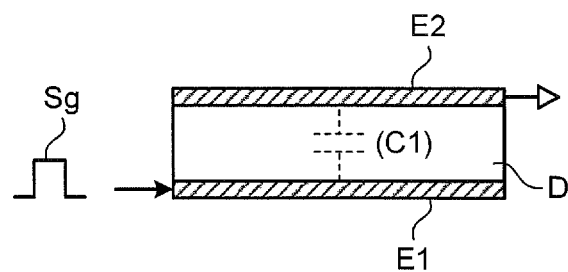
FIG. 2 is an explanatory diagram illustrating a state in which a finger is not in contact with or in proximity to the device, for explaining a basic principle of a capacitive touch detection method.
Figure 3:
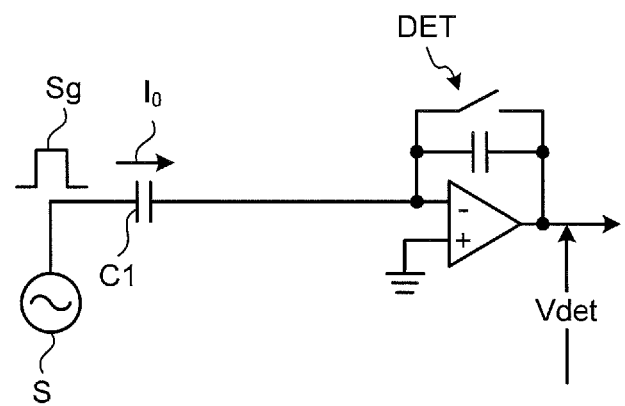
FIG. 3 is an explanatory diagram illustrating an example of an equivalent circuit in the state in which a finger is not in contact with or in proximity to the device as illustrated in FIG. 2.
Figure 4:
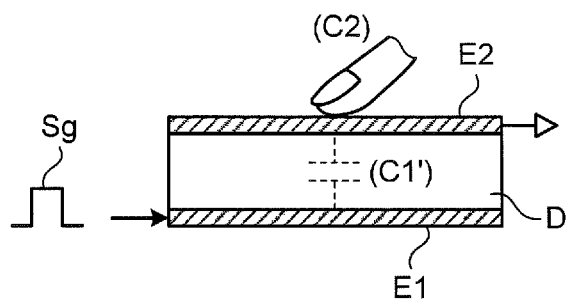
FIG. 4 is an explanatory diagram illustrating a state in which a finger is in contact with or in proximity to the device, for explaining the basic principle of the capacitive touch detection method.
Figure 5:
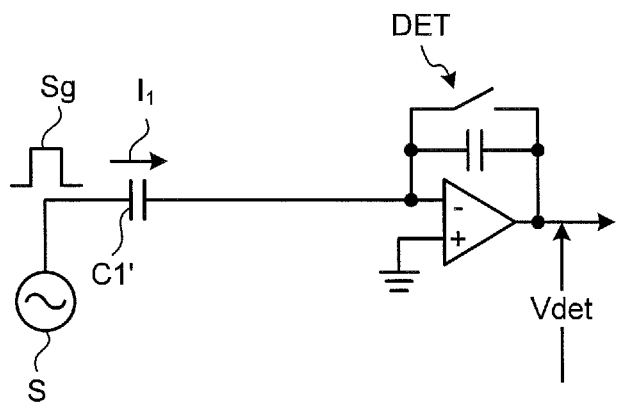
FIG. 5 is an explanatory diagram illustrating an example of the equivalent circuit in the state in which a finger is in contact with or in proximity to the device as illustrated in FIG. 4.
Figure 6:
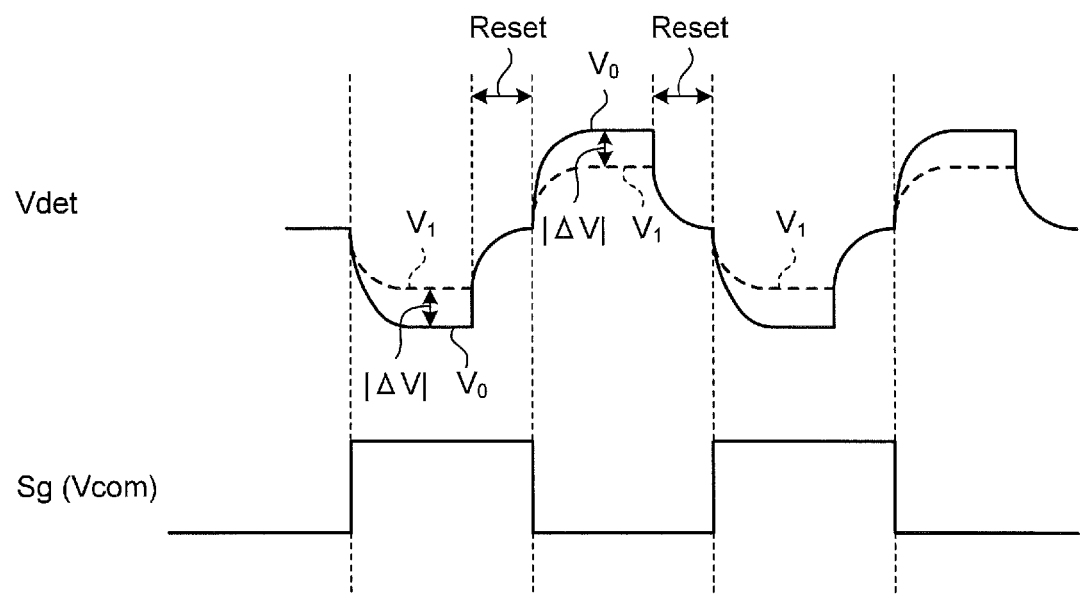
FIG. 6 is a diagram illustrating an example of waveforms of a driving signal and a touch detection signal.

The touch detection device 30 operates based on a basic principle of capacitive touch detection and outputs a touch detection signal Vdet. With reference to FIG. 1 to FIG. 6, the following describes the basic principle of touch detection in the display device with a touch detection function 1 according to the embodiment. FIG. 2 is an explanatory diagram illustrating a state in which a finger is not in contact with or in proximity to the device, for explaining the basic principle of the capacitive touch detection method. FIG. 3 is an explanatory diagram illustrating an example of an equivalent circuit in the state in which a finger is not in contact with or in proximity to the device as illustrated in FIG. 2. FIG. 4 is an explanatory diagram illustrating a state in which a finger is in contact with or in proximity to the device, for explaining the basic principle of the capacitive touch detection method. FIG. 5 is an explanatory diagram illustrating an example of the equivalent circuit in the state in which a finger is in contact with or in proximity to the device as illustrated in FIG. 4. FIG. 6 is a diagram illustrating an example of waveforms of the driving signal and the touch detection signal.

For example, as illustrated in FIG. 2 and FIG. 4, a capacitive element C1 includes a pair of electrodes, that is, a drive electrode E1 and a touch detection electrode E2 that are arranged in a manner opposed to each other with a dielectric substance D interposed therebetween. As illustrated in FIG. 3, the capacitive element C1 is coupled to an alternate current (AC) signal source (driving signal source) S at its one end and coupled to a voltage detector (touch detection unit) DET at its other end. For example, the voltage detector DET is an integrating circuit included in the amplifier 42 illustrated in FIG. 1.

When an AC rectangular wave Sg having a predetermined frequency (for example, about several kilohertz to several hundred kilohertz) is applied to the drive electrode E1 (one end of the capacitive element C1) from the AC signal source S, an output waveform (touch detection signal Vdet) appears via the voltage detector DET coupled to the touch detection electrode E2 (the other end of the capacitive element C1). The AC rectangular wave Sg corresponds to a driving signal Vcom (or VcomF) described later.

As illustrated in FIG. 2 and FIG. 3, in the state (non-contact state) in which a finger is not in contact with (or in proximity to) the device, an electric current $I_0$ corresponding to a capacitance value of the capacitive element C1 flows according to charge and discharge with respect to the capacitive element C1. As illustrated in FIG. 6, the voltage detector DET converts a variation in the electric current $I_0$ corresponding to the AC rectangular wave Sg to a variation in a voltage (waveform $V_0$ illustrated by a solid line).

As illustrated in FIG. 4, in the state (contact state) in which a finger is in contact with (or in proximity to) the device, capacitance C2 formed by the finger is in contact with or in proximity to the touch detection electrode E2. Accordingly, capacitance corresponding to a fringe between the drive electrode E1 and the touch detection electrode E2 is blocked and the capacitive element C1 functions as a capacitive element C1' of which capacitance value is smaller than the capacitance value of the capacitive element C1. According to an equivalent circuit illustrated in FIG. 5, an electric current $I_1$ flows through the capacitive element C1'. As illustrated in FIG. 6, the voltage detector DET converts a variation in the electric current $I_1$ corresponding to the AC rectangular wave Sg to a variation in the voltage (waveform $V_1$ illustrated by a dotted line). In this case, amplitude of the waveform $V_1$ is smaller than that of the waveform $V_0$ described above. Accordingly, an absolute value $|\Delta V|$ corresponding to a voltage difference between the waveform $V_0$ and the waveform $V_1$ is changed corresponding to influence of an object, such as a finger, approaching from the outside. To accurately detect the absolute value $|\Delta V|$ corresponding to the voltage difference between the waveform $V_0$ and the waveform $V_1$, the voltage detector DET is preferably configured to operate with a period Reset in which charge and discharge of a capacitor are reset corresponding to a frequency of the AC rectangular wave Sg by switching in the circuit.

The touch detection device 30 illustrated in FIG. 1 performs touch detection by sequentially scanning for each detection block according to the driving signal Vcom (driving signal VcomF described later) supplied from the drive electrode driver 14.

The touch detection device 30 is configured to output the touch detection signal Vdet for each detection block from a plurality of touch detection electrodes TDL (described later) via the voltage detector DET illustrated in FIG. 3 or FIG. 5, and supply the touch detection signal Vdet to the A/D convertor 43 of the touch detection unit 40.

The A/D convertor 43 is a circuit that samples each analog signal output from the amplifier 42 and converts the analog signal to a digital signal at a timing synchronized with the driving signal Vcom.

A signal processor 44 includes a digital filter that reduces frequency components (noise components), other than the frequency at which the driving signal Vcom is sampled, included in the output signal from the A/D convertor 43. The signal processor 44 is a logic circuit that detects whether or not the touch detection device 30 is touched based on the output signal from the A/D convertor 43. The signal processor 44 performs processing of taking out only a difference voltage caused by a finger. The difference voltage caused by the finger is the absolute value $|\Delta V|$ a difference between the waveform $V_0$ and the waveform $V_1$ described above. The signal processor 44 may perform an operation of averaging the absolute value $|\Delta V|$ per detection block to obtain a mean value of the absolute value $|\Delta V|$. Accordingly, the signal processor 44 can reduce influence by noise. The signal processor 44 compares the detected difference voltage caused by a finger with a predetermined threshold voltage. If the difference voltage is equal to or larger than the threshold voltage, it is determined that an external proximity object approaching from the outside is in the contact state, and if the difference voltage is less than the threshold voltage, it is determined that the external proximity object is in the non-contact state. In this way, the touch detection unit 40 can perform touch detection.

The coordinate extractor 45 is a logic circuit that obtains touch panel coordinates when touch is detected by the signal processor 44. A detection timing controller 46 controls the A/D convertor 43, the signal processor 44, and the coordinate extractor 45 to be operated in synchronization with one another. The coordinate extractor 45 outputs the touch panel coordinates as a signal output Vout.

The control unit 11 supplies a three-dimensional display control signal Vsig3D to the lens control driver 15 based on the video signal Vdisp supplied from the outside. The lens control driver 15 supplies a lens driving signal V3$d$ to the liquid crystal lens 50 in accordance with the three-dimensional display control signal Vsig3D. To the liquid crystal lens 50, lens driving voltages each corresponding to one of lens columns described later are applied in accordance with the lens driving signal V3d.

Module

Figure 7:
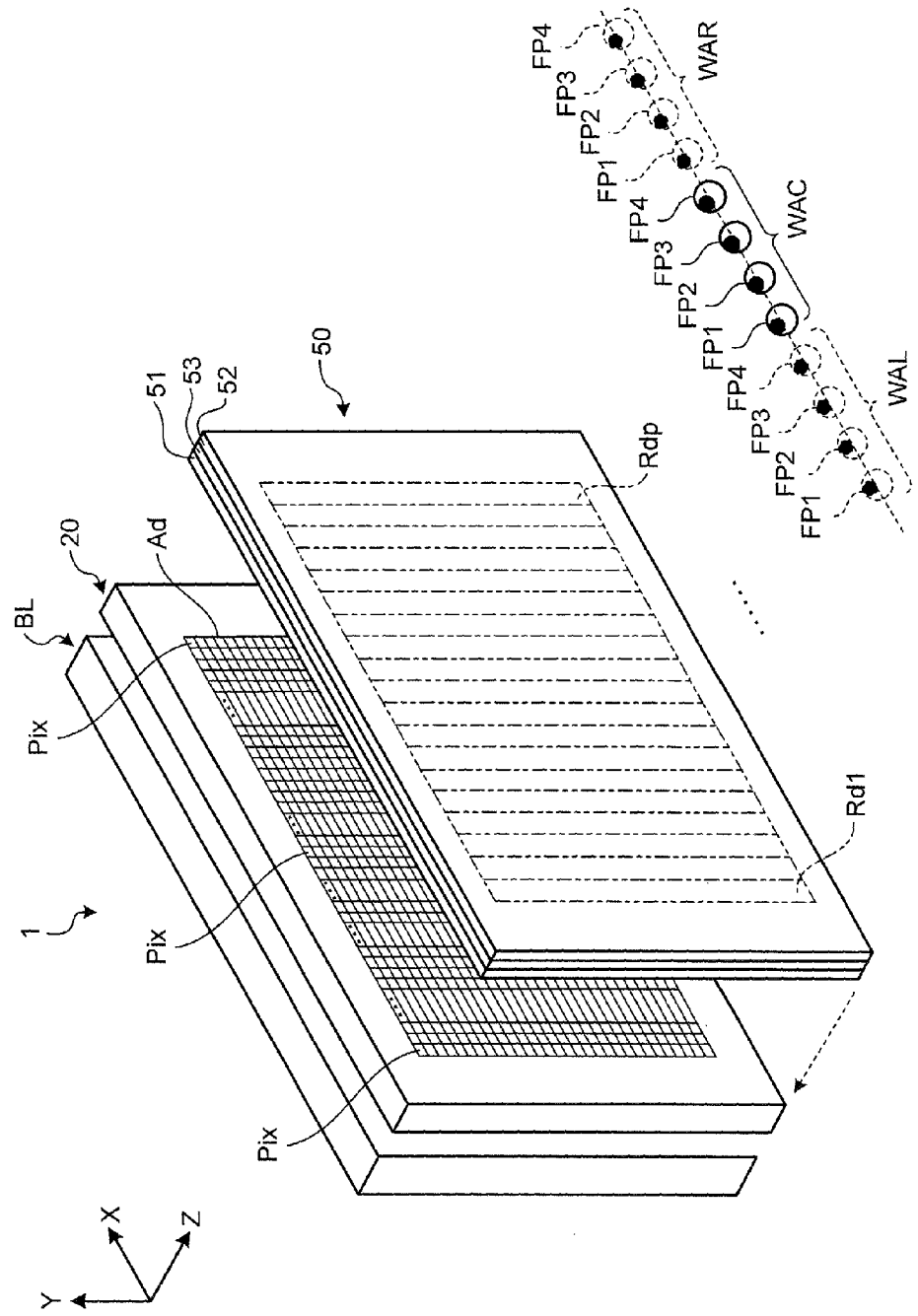
FIG. 7 is a diagram illustrating an example of a module of the display device with a touch detection function.
Figure 8:
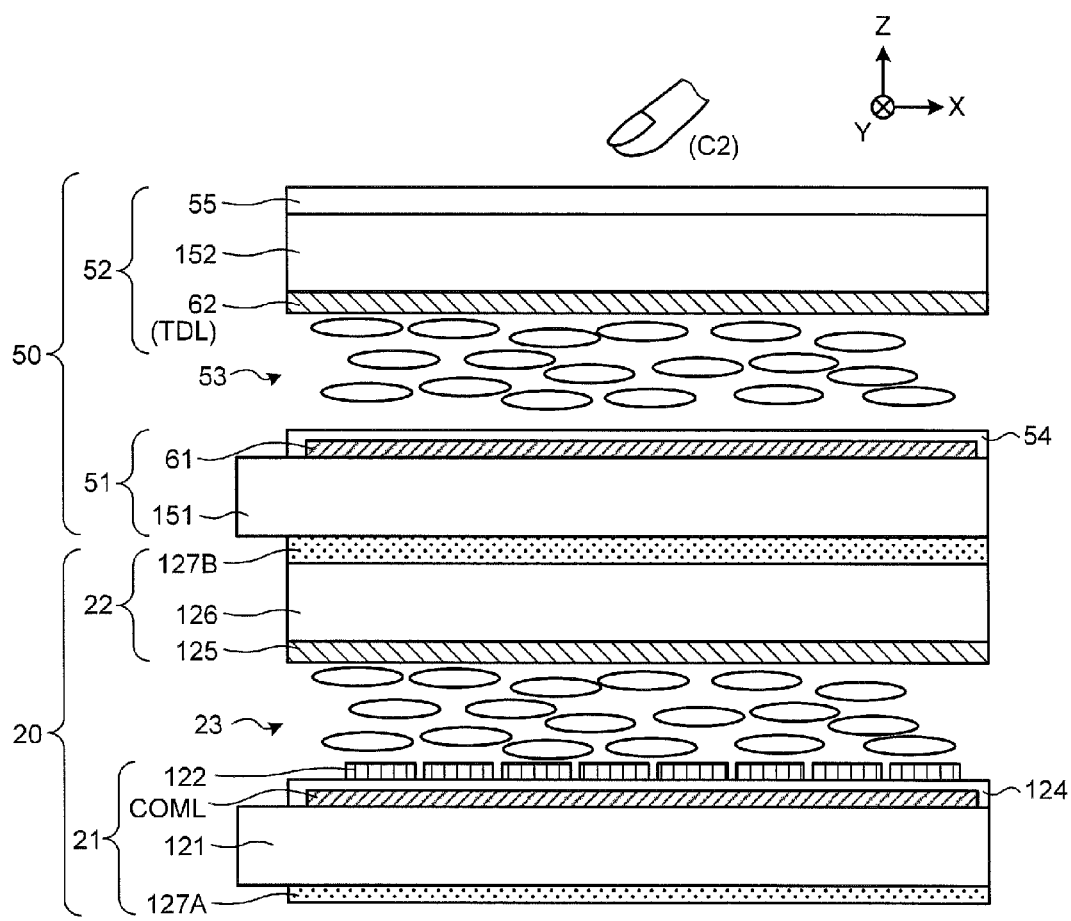
FIG. 8 is a cross-sectional view illustrating a schematic cross-sectional structure of the display device with a touch detection function according to the first embodiment.

FIG. 7 is a diagram illustrating an example of a module to which the display device with a touch detection function is mounted. FIG. 8 is a cross-sectional view illustrating a schematic cross-sectional structure of the display device with a touch detection function according to the first embodiment. As illustrated in FIG. 7, the liquid crystal lens 50 includes a first substrate 51, a second substrate 52, and a liquid crystal layer 53 arranged between the first substrate 51 and the second substrate 52. The liquid crystal lens 50 is arranged in a manner opposed to a display region Ad of the display unit 20. In the display region Ad, pixels Pix are arranged in a matrix. The liquid crystal lens 50 and the display unit 20 are held by a holding member (not illustrated) so as to be opposed to each other with a predetermined space that is set in a process of design interposed therebetween. A lighting unit BL for emitting light is arranged on a back surface side of the display unit 20. The lighting unit BL is also called a backlight unit and includes members such as a light source, a prism sheet, a diffusion sheet, and a light guide plate.

In the liquid crystal lens 50, p pieces of lens columns Rd1, . . . , Rdp (variable lens columns) each extending in a vertical direction (Y-direction) are arranged side by side in a horizontal direction (X-direction). As illustrated in FIG. 7, a p-th lens column is represented as a lens column Rdp. In the following descriptions, any one of the lens columns Rd1, . . . , Rdp is also referred to as a "lens column Rd" without distinguishing them from each other. In the liquid crystal lens 50, the number of gazing points of an image displayed in the display region Ad is four, that is, gazing points FP1, FP2, FP3, and FP4 in a central observation region WAC. The number of the gazing points is merely an example. The number of the observation regions and the number of viewpoints can be appropriately set according to the display device with a touch detection function. For example, by preferably setting a positional relation between an array of the pixels Pix and an array of the lens column Rd in the display region Ad, an image can be observed at each of the gazing points FP1, FP2, FP3, and FP4, also in an observation region WAL on the left side of the central observation region WAC and in an observation region WAR on the right side of the central observation region WAC.

As illustrated in FIG. 8, the liquid crystal lens 50 includes a first translucent substrate 151 having a first electrode 61, a second translucent substrate 152 having a second electrode 62, and the liquid crystal layer 53 arranged between a first electrode 61 side of the first translucent substrate 151 and a second electrode 62 side of the second translucent substrate 152. The first translucent substrate 151 and the second translucent substrate 152 are, for example, glass substrates. The first electrode 61 and the second electrode 62 are formed of translucent conductive oxide such as indium tin oxide (ITO) and indium zinc oxide (IZO) as material of a translucent electrode.

One of the first electrode 61 and the second electrode 62 is fixed to a common potential for varying focuses, for example. The common potential for varying focuses may be fixed by coupling the electrode to a common potential line or by grounding the electrode. To the other one of the first electrode 61 and the second electrode 62, applied is a lens driving voltage corresponding to the lens driving signal V3d from the lens control driver 15 illustrated in FIG. 1, for example.

In the first embodiment, the second electrode 62 illustrated in FIG. 8 is the touch detection electrode TDL. In the first embodiment, the touch detection device 30 includes a drive electrode COML provided to a pixel substrate 21 and the touch detection electrode TDL serving as the second electrode 62 illustrated in FIG. 8.

The liquid crystal layer 53 includes nematic liquid crystal, and has homogeneous alignment, for example. Respective surfaces on the liquid crystal layer 53 side of the first substrate 51 and the second substrate 52 are subjected to alignment processing for setting an alignment direction of liquid crystal molecules. The alignment processing can be performed by a well-known method such as forming an orientation film 54 to which rubbing treatment is applied, for example. The orientation film 54 is configured to control an alignment state of the liquid crystal in the liquid crystal layer 53, and formed of polyimide and the like, for example. In FIG. 8, although the orientation film 54 is illustrated on the liquid crystal layer 53 side of the first substrate 51, it may be on the liquid crystal layer 53 side of the second substrate 52.

A cover part 55 is arranged on a surface of the second translucent substrate 152 opposite to the second electrode 62 side, and includes a polarizing plate, a cover glass, photoelastic resin, and the like.

Figure 9:
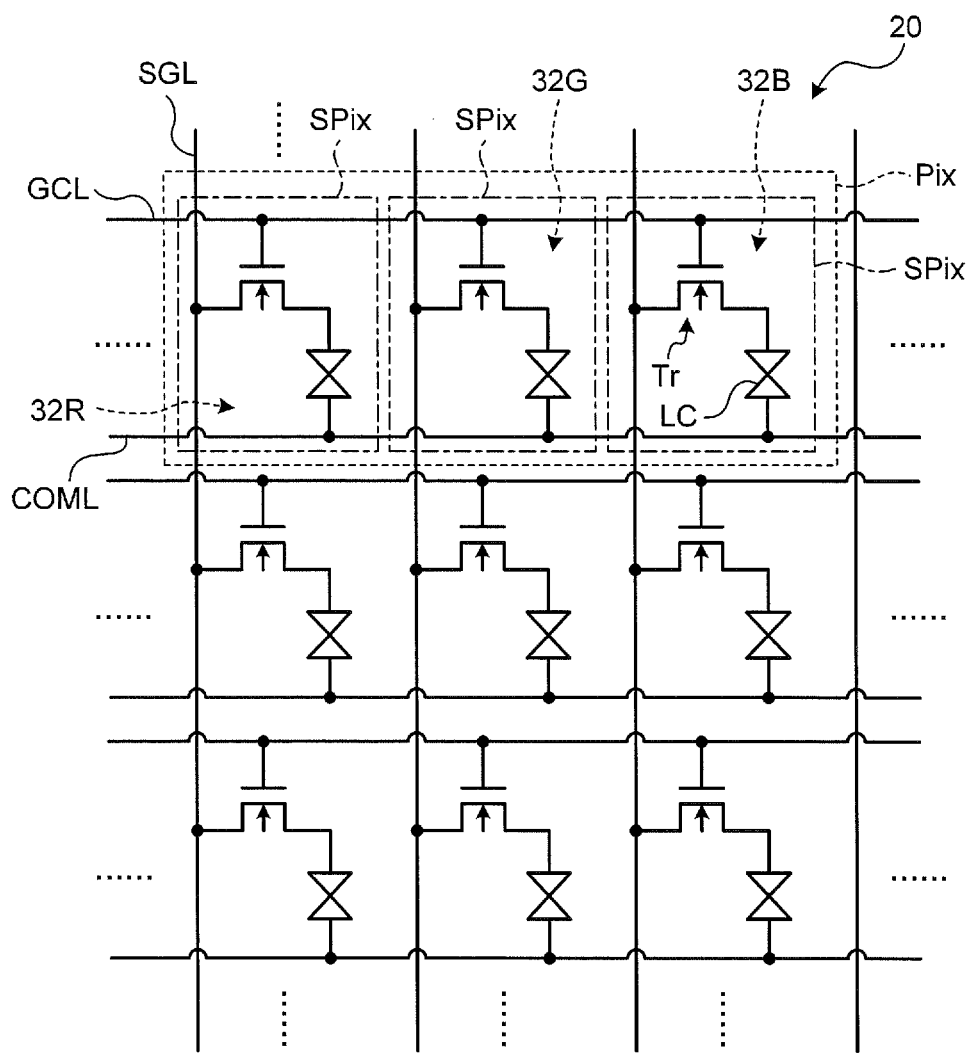
FIG. 9 is a circuit diagram illustrating a pixel arrangement of the display device with the touch detection function according to the first embodiment.
Figure 10:
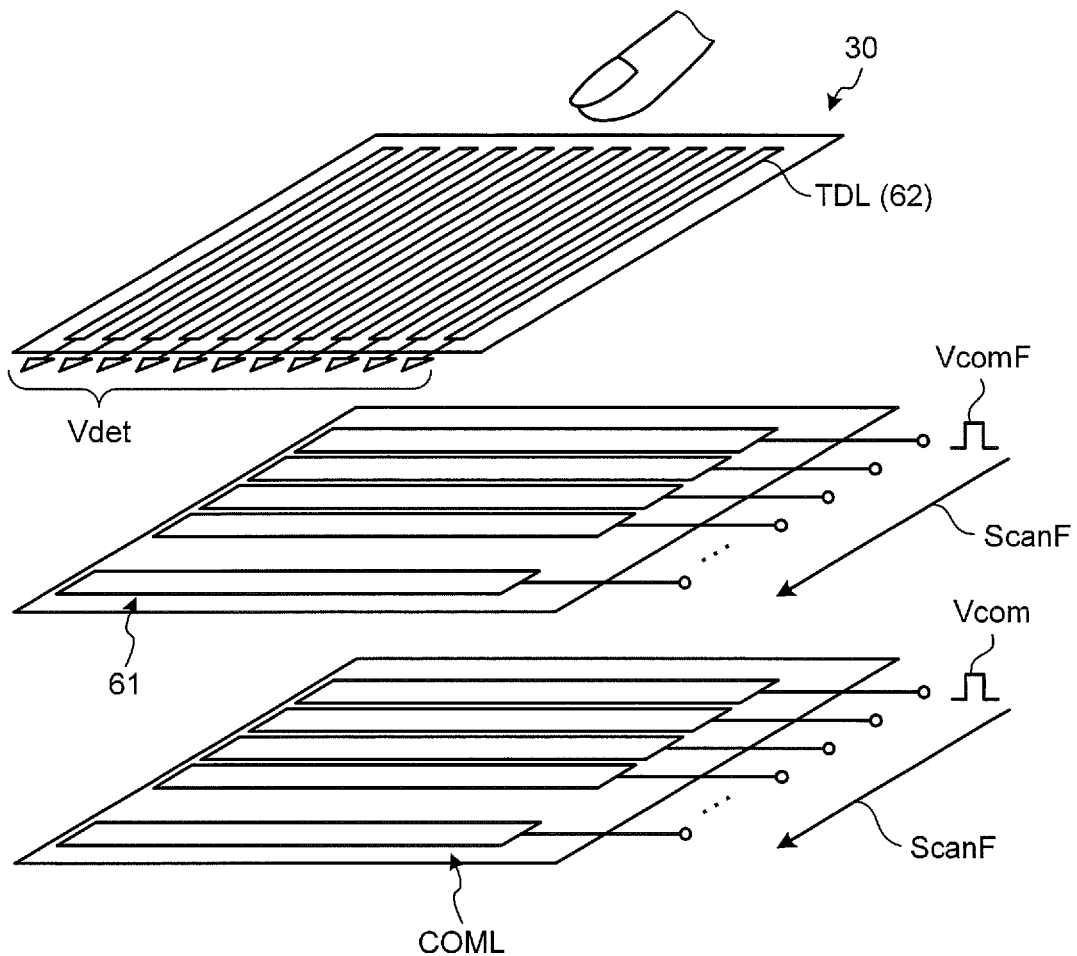
FIG. 10 is a perspective view illustrating a configuration example of drive electrodes and touch detection electrodes of the display device with a touch detection function according to the first embodiment.

The following describes the display unit 20 and the touch detection function with reference to FIG. 8, FIG. 9, and FIG. 10. FIG. 9 is a circuit diagram illustrating a pixel arrangement of the display device with a touch detection function according to the first embodiment. FIG. 10 is a perspective view illustrating a configuration example of the drive electrodes and the touch detection electrodes of the display device with a touch detection function according to the first embodiment. The display unit 20 includes the pixel substrate 21, a counter substrate 22 arranged in a manner opposed to the pixel substrate 21 in a direction orthogonal to a surface thereof, and a liquid crystal layer 23 interposed between the pixel substrate 21 and the counter substrate 22.

The pixel substrate 21 includes a translucent substrate 121 serving as a circuit board, a plurality of pixel electrodes 122 arranged on the translucent substrate 121 in a matrix, a plurality of drive electrodes COML formed between the translucent substrate 121 and the pixel electrode 122, an insulating layer 124 that insulates the pixel electrodes 122 from the drive electrodes COML, and a polarizing plate 127A.

On the translucent substrate 121, formed are thin film transistor (TFT) elements Tr provided respectively to sub-pixels SPix illustrated in FIG. 9, and wiring illustrated in FIG. 9 such as signal line SGL that supplies a pixel signal Vpix to the corresponding pixel electrodes 122, and scanning lines GCL that drives the corresponding TFT elements Tr. In this way, the signal lines SGL extend on a plane parallel to the surface of the translucent substrate 121, and supply the pixel signal Vpix for displaying an image to the corresponding pixels. In the display unit 20 illustrated in FIG. 9, each of the sub-pixels SPix arranged in a matrix includes the TFT element Tr and a liquid crystal element LC. The TFT element Tr is a switching element configured by the thin film transistor. In this example, the TFT element Tr is configured by an n-channel metal oxide semiconductor (MOS) type TFT. One of a source and a drain of the TFT element Tr is coupled to one of the signal lines SGL, a gate thereof is coupled to one of the scanning lines GCL, and the other one of the source and the drain is coupled to one end of the liquid crystal element LC. For example, one end of the liquid crystal element LC of the liquid crystal layer 23 is coupled to the other one of the source and the drain of the TFT element Tr, and the other end thereof is coupled to one of the drive electrodes COML.

Each of the sub-pixels SPix illustrated in FIG. 9 is coupled to the other sub-pixels SPix belonging to the same row of the display unit 20 by one of the scanning lines GCL. The scanning lines GCL are coupled to the gate driver 12 and supplied with the scanning signal Vscan from the gate driver 12. Each of the sub-pixels SPix is coupled to the other sub-pixels SPix belonging to the same column of the display unit 20 by one of the signal lines SGL. The signal lines SGL are coupled to the source driver 13 and supplied with the pixel signal Vpix from the source driver 13. Each of the sub-pixels SPix is further coupled to the other sub-pixels SPix belonging to the same row of the display unit 20 by one of the drive electrodes COML. The drive electrodes COML are coupled to the drive electrode driver 14 and supplied with the driving signal Vcom from the drive electrode driver 14. That is, in this example, the sub-pixels SPix belonging to the same row share one drive electrode COML.

The gate driver 12 illustrated in FIG. 1 applies the scanning signal Vscan to the gate of the TFT element Tr of the sub-pixels SPix via the scanning lines GCL illustrated in FIG. 9 to sequentially select, as a display driving target, a row (one horizontal line) of the sub-pixels SPix formed in a matrix in the display unit 20. The source driver 13 illustrated in FIG. 1 supplies the pixel signals Vpix to the sub-pixels SPix included in one horizontal line sequentially selected by the gate driver 12 via the signal lines SGL illustrated in FIG. 9. In these sub-pixels SPix, one horizontal line is displayed corresponding to the supplied pixel signals Vpix.

As described above, in the display unit 20, the gate driver 12 drives the scanning lines GCL to perform line-sequential scanning in a time division manner, thereby sequentially selecting each of the horizontal lines. Furthermore, in the display unit 20, the source driver 13 supplies the pixel signals Vpix to the sub-pixels SPix belonging to one horizontal line, so that the horizontal lines are displayed one by one. When the display operation is performed, the drive electrode driver 14 applies the driving signal Vcom as the common potential to a block including the drive electrode COML corresponding to the horizontal line.

The liquid crystal layer 23 modulates light passing therethrough corresponding to a state of an electric field. The liquid crystal layer 23 is driven with a horizontal electric field mode, such as a fringe field switching (FFS) mode or an in-plane switching (IPS) mode, for example. Orientation films may be arranged between the liquid crystal layer 23 and the pixel substrate 21, and between the liquid crystal layer 23 and the counter substrate 22 illustrated in FIG. 8, respectively.

The counter substrate 22 includes a translucent substrate 126 and a color filter 125 formed on one surface of the translucent substrate 126. The touch detection electrode TDL serving as a detection electrode of the touch detection device 30 is formed on the other surface of the translucent substrate 126, and a polarizing plate 127B is arranged on the touch detection electrode TDL.

In the color filter 125 illustrated in FIG. 8, for example, color regions of the color filter colored in red (R), green (G), and blue (B) are periodically arranged, color regions 32R, 32G, and 32B (refer to FIG. 9) of three colors R, G, and B are associated with the sub-pixels SPix illustrated in FIG. 9 described above, so that the pixel Pix is configured by the color regions 32R, 32G, and 32B as a set. The pixels Pix are arranged in a matrix along a direction parallel to the scanning line GCL and a direction parallel to the signal line SGL, and form the display region Ad. The color filter 125 is opposed to the liquid crystal layer 23 in a direction orthogonal to the translucent substrate 121. In this way, the sub-pixel SPix can perform monochromatic color display. The color filter 125 may include other combination of colors as long as they are different colors. The color filter 125 may not be provided. In this way, there may be a region without the color filter 125, that is, a translucent sub-pixel SPix.

Touch Detection Function

The drive electrodes COML according to the first embodiment function as drive electrodes of the display unit 20, and also as drive electrodes of the touch detection device 30. The drive electrode driver 14 illustrated in FIG. 1 applies a driving signal Vcom to the drive electrodes COML to drive them in a unit of block including the predetermined number of drive electrodes COML illustrated in FIG. 10. As illustrated in FIG. 8, the drive electrodes COML illustrated in FIG. 10 are opposed to the pixel electrodes 122 in a direction orthogonal to the surface of the translucent substrate 121. The touch detection device 30 includes the drive electrodes COML arranged on the pixel substrate 21 and the touch detection electrodes TDL corresponding to the second electrode 62 illustrated in FIG. 8. The touch detection electrodes TDL are configured by stripe-shaped electrode patterns extending in a direction that intersects an extending direction of electrode patterns of the drive electrodes COML. The touch detection electrodes TDL are opposed to the drive electrodes COML in a direction orthogonal to the surface of the translucent substrate 121. Each electrode pattern of the touch detection electrode TDL is an electrode pattern of the second electrode 62, and is coupled town input of the amplifier 42 of the touch detection unit 40. The electrode patterns of the drive electrodes COML and the touch detection electrodes TDL intersecting each other form capacitance at each intersection thereof. The touch detection electrodes TDL and the drive electrodes COML (drive electrode block) are not limited to a shape that is divided into a plurality of stripe-shaped pieces. The touch detection electrodes TDL and the drive electrodes COML (drive electrode block) may, for example, have a comb-teeth shape. Alternatively, it is sufficient that the touch detection electrodes TDL or the drive electrodes COML (drive electrode block) is have a shape that is divided into a plurality of pieces, and the shape of a slit for dividing may be a straight line or a curved line.

There is the first electrode 61 between the drive electrode COML according to the first embodiment and the second electrode 62 serving as the touch detection electrode TDL. Accordingly, there is possibility that change in mutual capacitance will be reduced between the drive electrode COML and the second electrode 62 serving as the touch detection electrode TDL.

The first electrode 61 according to the first embodiment is divided into a plurality of pieces, and the divided pieces extend in a direction parallel to the direction in which the drive electrodes COML extend. Furthermore, when the touch detection unit 40 is performing touch detection operation, the first electrode 61 is caused to be in a floating state in which an electric potential is not fixed.

With this configuration, when the touch detection operation is performed in the touch detection device 30, the drive electrode driver 14 drives the drive electrode block to perform line-sequential scanning in a time division manner. Accordingly, each one of the detection blocks of the drive electrodes COML is sequentially selected in a scanning direction ScanF.

The first electrode 61 according to the first embodiment is in a floating state in which the electric potential is not fixed. Accordingly, each one detection block of the drive electrodes COML that is sequentially selected changes the electric potential of the electrode pattern of the first electrode 61 that overlaps therewith in a direction orthogonal to the first translucent substrate 151, and such a change in the electric potential sequentially occurs in the scanning direction ScanF. As a result, a touch driving signal VcomF synchronized with the driving signal Vcom that is applied to the drive electrode COML is transmitted to the electrode patterns of the first electrode 61 in the scanning direction ScanF. The drive electrode COML causes the touch detection electrodes TDL to output the touch detection signal Vdet via the electrode pattern of the first electrode 61 to which the touch driving signal VcomF is transmitted. In this way, in the touch detection device 30, touch detection is performed for one detection block. As illustrated in FIG. 10, the electrode patterns intersecting each other constitute the capacitive touch sensors in a matrix. Accordingly, it is possible to detect a position where an external proximity object is in contact with or in proximity to the device by scanning across the entire touch detection surface of the touch detection device 30.

Figure 11:
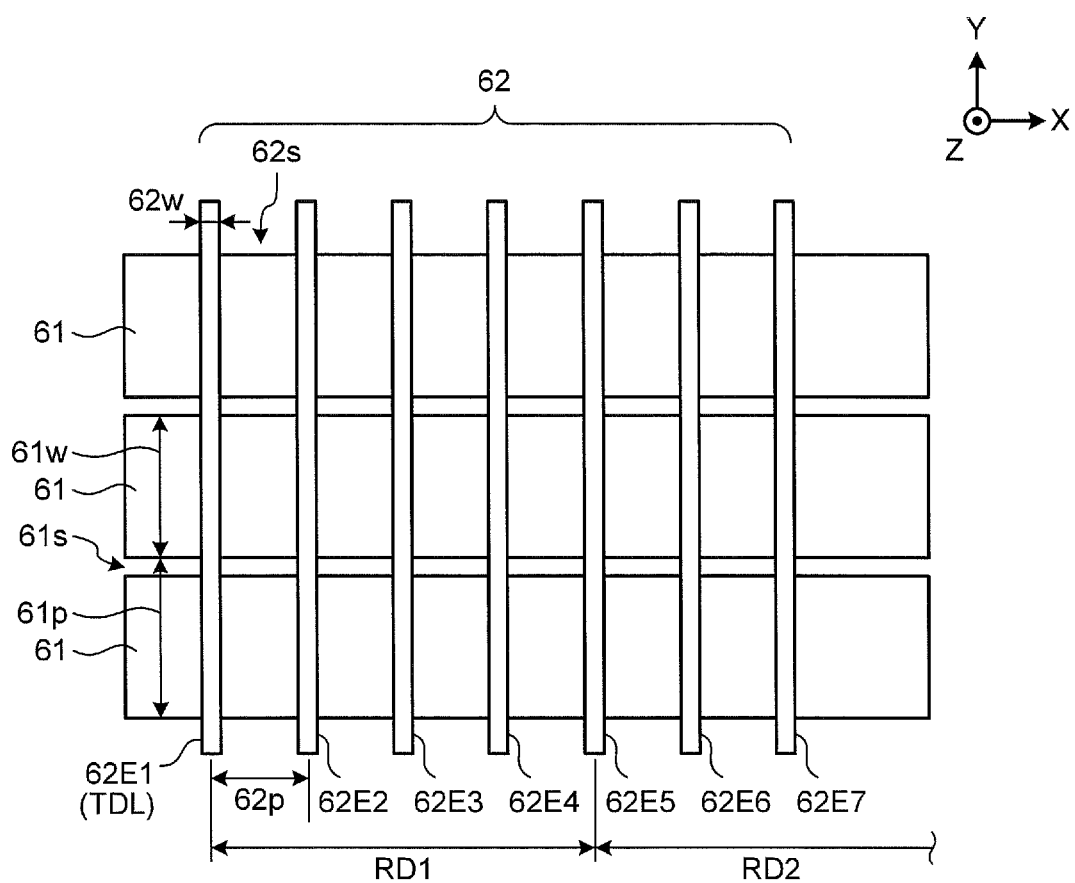
FIG. 11 is an explanatory diagram illustrating an example of a first electrode and a second electrode according to the first embodiment.

FIG. 11 is an explanatory diagram illustrating an example of the first electrode and the second electrode according to the first embodiment. FIG. 11 illustrates a positional relation between the second electrode 62 and the first electrode 61 that are overlapped with each other in the direction orthogonal to the surface of the translucent substrate 121. The second electrode 62 is opposed to the drive electrode COML in the direction orthogonal to the surface of the translucent substrate 121. Each of the electrode patterns of the touch detection electrode TDL is coupled to the input of the amplifier 42 of the touch detection unit 40.

It is preferable that the electrode patterns obtained by dividing the first electrode 61 into a plurality of pieces be similar to the electrode patterns of the drive electrodes COML. As described above, the first electrode 61 is divided by a slit 61s without an electric conductor. It is more preferable that the electrodes pattern obtained by dividing the first electrode 61 into a plurality of pieces have the same shape as the electrode patterns of the drive electrodes COML. For example, an arrangement pitch 61p of the electrode pattern of the first electrode 61 is substantially the same as an arrangement pitch of one detection block of the drive electrode COML. The space between the electrode patterns of the first electrode 61 (arrangement pitch 61p-width 61w of the electrode pattern of the first electrode 61) is preferably 10 μm or less to make a lens surface Lref (described later) uniform.

The second electrode 62 is divided by a slit 62s without an electric conductor to be stripe-shaped electrode patterns 62E1, 62E2, 62E3, 62E4, 62E5, 62E6, 62E7 . . . extending in a direction intersecting the extending direction of the electrode patterns of the first electrode 61. A width 62w of each of the electrode patterns 62E1, 62E2, 62E3, 62E4, 62E5, 62E6, and 62E7 is narrower than the width 61w of the electrode pattern of the first electrode 61. The width 61w of the electrode pattern of the first electrode 61 is larger than the width 62w, so that the common potential for varying focus can be applied more uniformly. The arrangement pitch 62p of the electrode patterns 62E1, 62E2, 62E3, 62E4, 62E5, 62E6, and 62E7 depends on a lens pattern defined by widths RD1, RD2 . . . the lens columns Rd described above.

Lens Pattern

Figure 12:
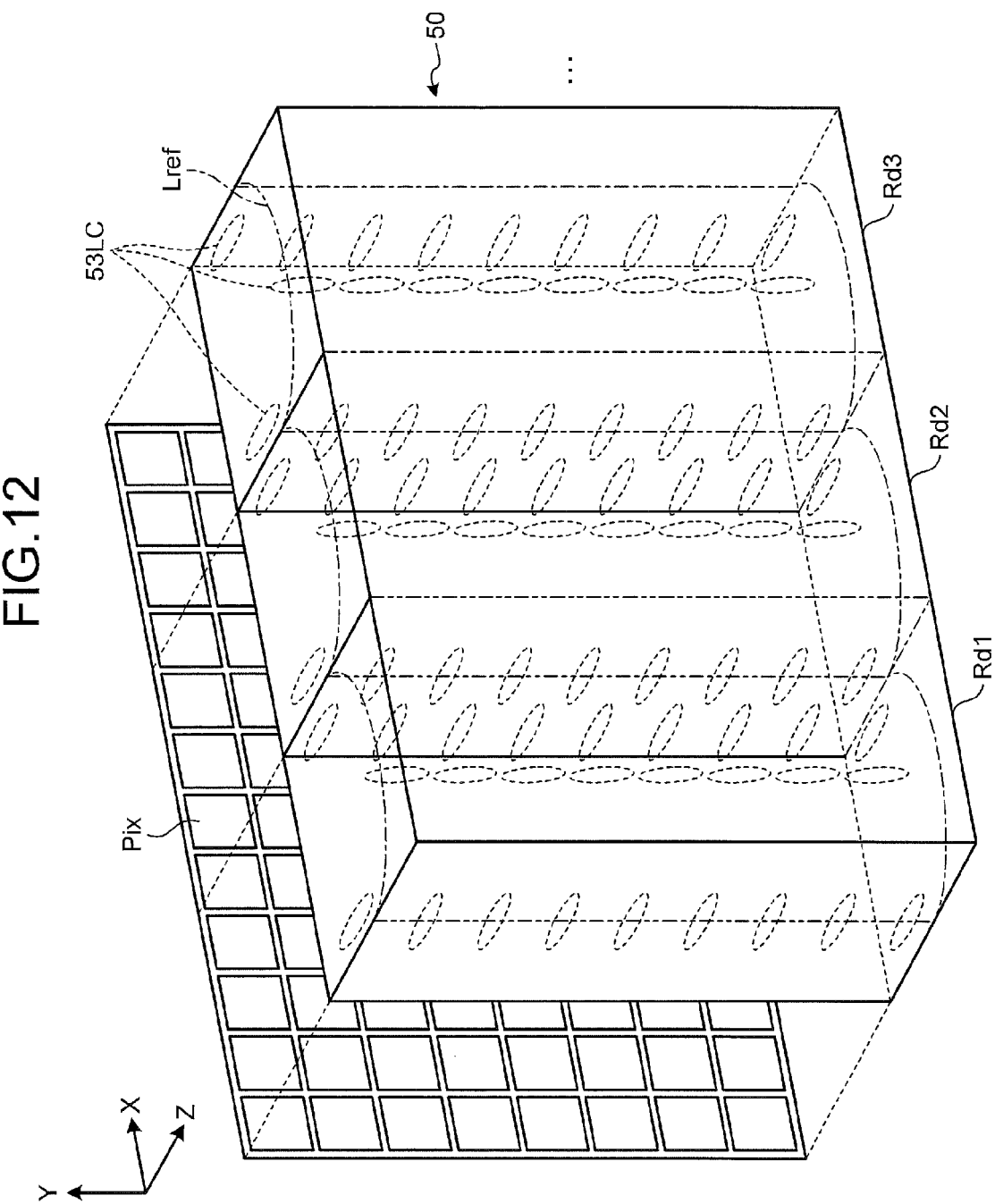
FIG. 12 is a schematic diagram illustrating an operation example of a liquid crystal lens of the display device with a touch detection function according to the first embodiment.
Figure 13:
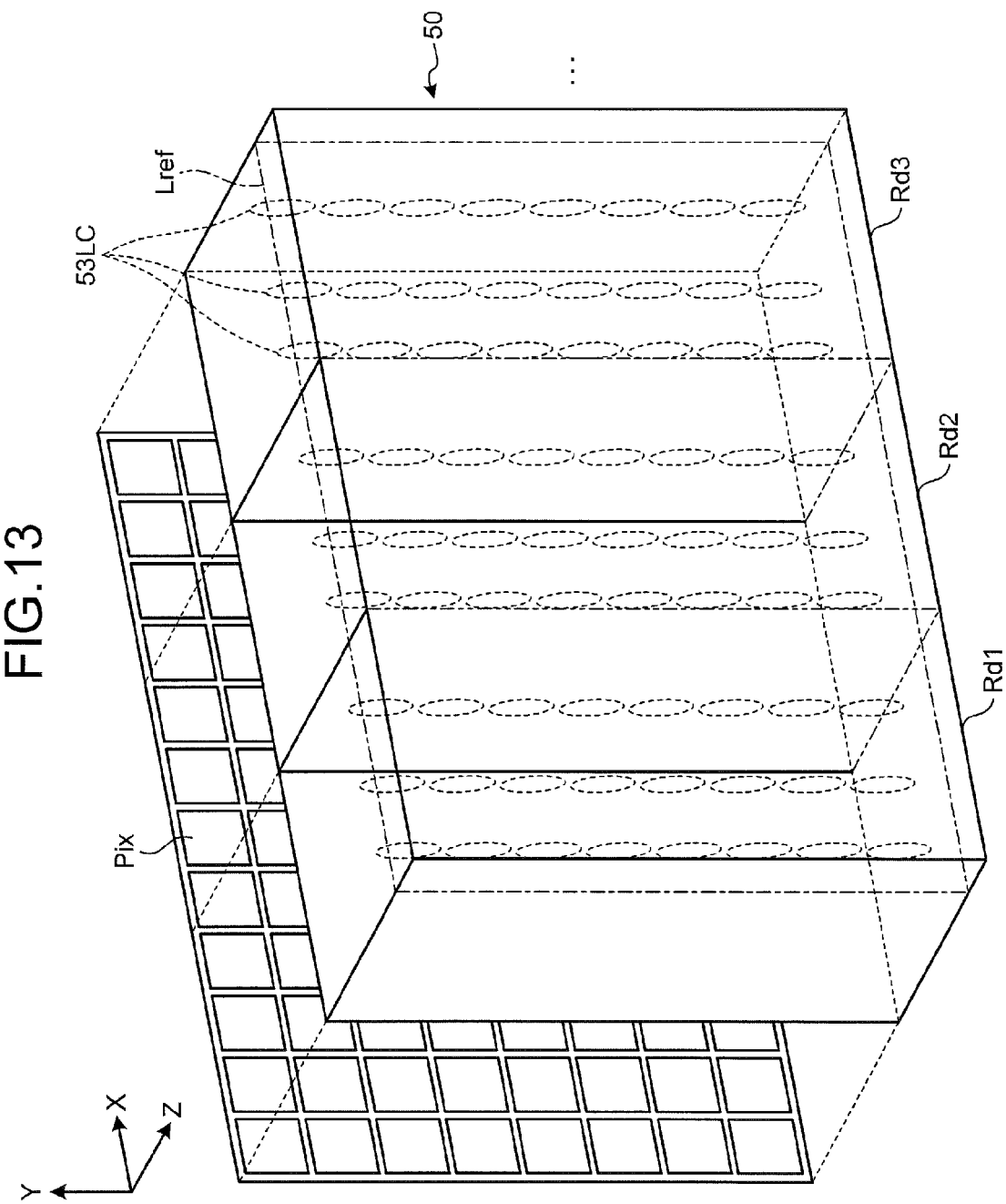
FIG. 13 is a schematic diagram illustrating an operation example of the liquid crystal lens of the display device with a touch detection function according to the first embodiment.

FIG. 12 and FIG. 13 are schematic diagrams illustrating an operation example of the liquid crystal lens of the display device with a touch detection function according to the first embodiment. In the liquid crystal lens 50 illustrated in FIG. 12 and FIG. 13, the lens columns Rd1, Rd2, and Rd3 are partially and schematically illustrated. To the electrode pattern 62E1 and the electrode pattern 62E5 illustrated in FIG. 11, applied is the lens driving voltage (lens voltage) corresponding to the lens driving signal V3d from the lens control driver 15 illustrated in FIG. 1. Orientation of liquid crystal molecules 53LC in a state in which the lens driving voltage is applied thereto is greatly changed at the peripheries of the electrode pattern 62E1 and the electrode pattern 62E5, and is not much changed at a central part of the width RD1 of the lens column Rd1. Accordingly, the lens surface Lref is formed with the liquid crystal molecules 53LC for each of the lens columns Rd1, Rd2, and Rd3 so that the liquid crystal layer 53 works as a variable focus layer that changes a refractive index of transmitted light in accordance with the lens driving voltage, and a direction of incident light incident from the pixel Pix is changed when the light is emitted. In this case, the display device with a touch detection function 1 can three-dimensionally display an image displayed in the display region Ad. In the display device with a touch detection function 1, for example, in a case of two-parallax display of LR that can achieve autostereoscopic display, the width RD1 of the lens column Rd1 is about 100 μm to 200 μm. The width 62w is about 10 μm. Although the liquid crystal layer is exemplified above as the variable focus layer according to the first embodiment, the variable focus layer may be a liquid lens. In a case of the liquid lens, on/off control can be performed on the lens by a certain signal.

The lens control driver 15 illustrated in FIG. 1 applies the lens driving voltage corresponding to the lens driving signal V3d not just to the electrode pattern 62E1 and the electrode pattern 62E5 but to all the electrode patterns 62E1, 62E2, 62E3, 62E4, and 62E5, so that the shape of the lens surface Lref can be finely changed. The lens driving voltage is preferably applied to the electrode patterns 62E1, 62E2, 62E3, 62E4, and 62E5 by the lens control driver 15 illustrated in FIG. 1 so as to generate an electric potential of which distribution is symmetrical to the middle of the electrode pattern 62E1 and the electrode pattern 62E5. When the lens control driver 15 applies the lens driving voltage to the electrode patterns 62E1, 62E2, 62E3, 62E4, and 62E5, for example, the lens surface Lref formed by the liquid crystal molecules 53LC is changed so as to change the observation regions WAR, WAC, and WAL in response to movement of the eyeballs of a person. In this way, eye-tracking drive is enabled in the display device with a touch detection function 1. Furthermore, the display device with a touch detection function 1 can enhance accuracy of a variable focus at which the liquid crystal layer 53 changes the refractive index of transmitted light in accordance with the lens driving voltage.

When the lens voltage corresponding to the lens driving signal V3d is not applied from the lens control driver 15 illustrated in FIG. 1 to the electrode pattern 62E1 and the electrode pattern 62E5 illustrated in FIG. 11, the lens surface Lref formed by the liquid crystal molecules 53LC becomes a plane substantially parallel to the display region Ad as illustrated in FIG. 13, and the incident light incident from the pixel Pix is emitted in a direction same as the incident direction. In this case, the display device with a touch detection function 1 two-dimensionally displays an image displayed in the display region Ad. In this way, the liquid crystal lens 50 can switch the two-dimensional display and the three-dimensional display of the image in accordance with the drive by the lens control driver 15.

Figure 14:
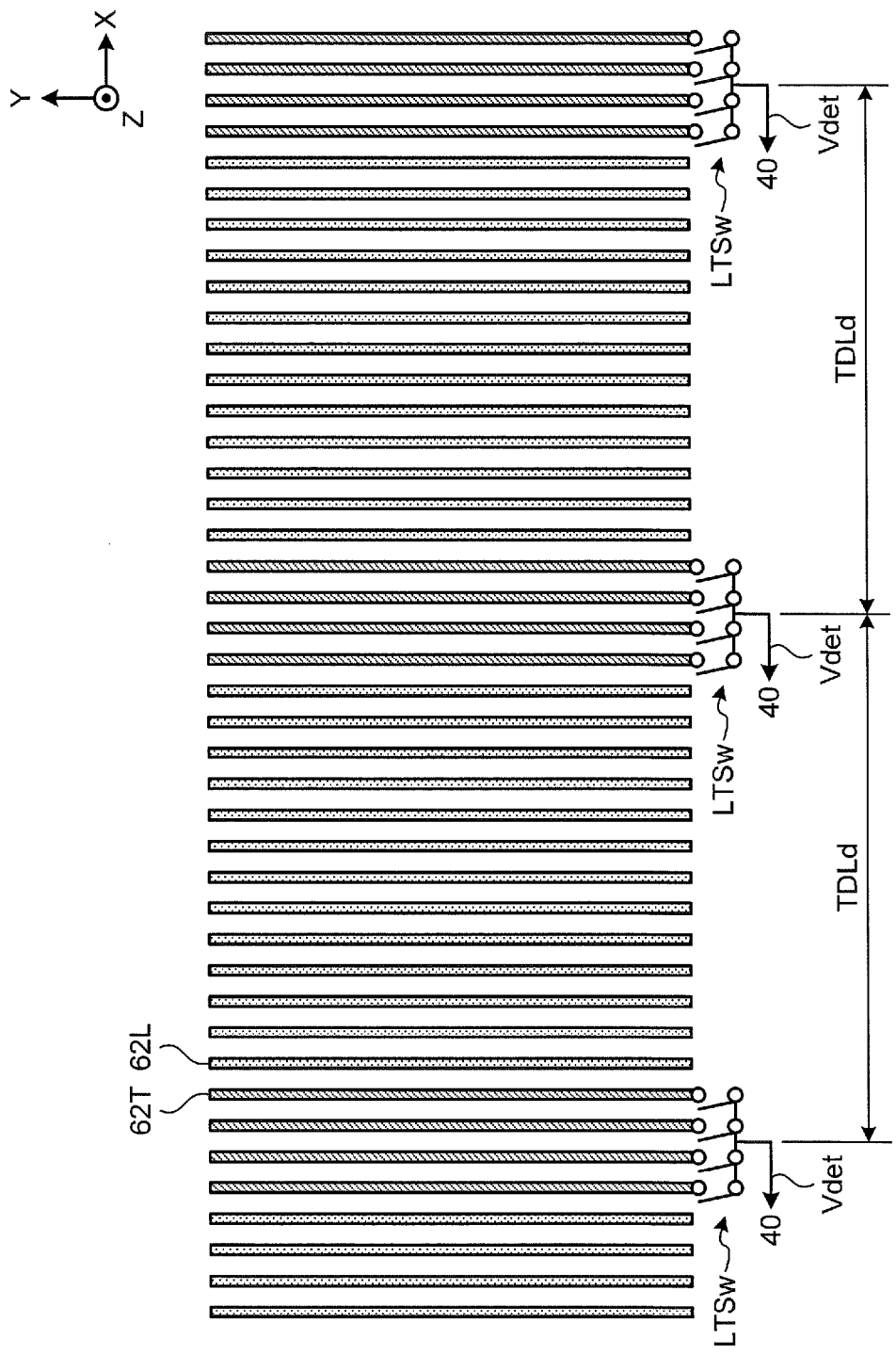
FIG. 14 is a schematic diagram illustrating an example of an arrangement of the second electrode according to the first embodiment.

FIG. 14 is a schematic diagram illustrating an example of an arrangement of the second electrode according to the first embodiment. The second electrode 62 may be used as the touch detection electrode TDL, and also as a lens drive electrode for applying the lens voltage. An arrangement pitch TDLd of the touch detection electrode TDL may be several millimeters. Accordingly, as illustrated in FIG. 14, the second electrodes 62 may include touch detection electrodes 62T that operate as the touch detection electrodes TDL and lens drive electrode 62L that apply the lens voltage, arranged in such a pattern that the touch detection electrodes 62T are arranged in an arrangement pitch TDLd.

The following configuration can be adopted: switches LTSw illustrated in FIG. 14 are always set in a conductive state; the touch detection electrodes 62T arranged adjacent to each other are bundled as a bulk in which the touch detection electrodes 62T are conducting at ends thereof; and the bundles of the touch detection electrodes 62T are arranged in an arrangement pitch TDLd. In this case, each of the switches LTSw may be wiring of an electric conductor in the conductive state. This structure improves sensitivity of the touch detection signal Vdet detected by a bundle of the touch detection electrodes 62T. Even if one of the touch detection electrodes 62T is disconnected, detection sensitivity of the touch detection signal Vdet can be prevented from being degraded. Each bundle of the touch detection electrodes 62T is coupled to the touch detection unit 40 as a bulk, so that an area of connection wiring can be reduced to contribute to downsizing of the display device with a touch detection function 1. Each bundle of the touch detection electrodes 62T is coupled to the touch detection unit 40, so that an area of three-dimensional wiring using conductive beads can be secured and design of routing the wiring is facilitated.

Each of the switches LTSw may switch a conductive state and a disconnecting state of the corresponding bundle of the touch detection electrodes 62T. When the switch LTSw electrically disconnects the ends of the touch detection electrodes 62T, the touch detection electrode 62T may be operated as the lens drive electrode for applying the lens voltage. With this structure, detection sensitivity of one bundle of the touch detection electrodes 62T is improved. Even if one of the touch detection electrodes 62T is disconnected, the detection sensitivity can be prevented from being degraded. Furthermore, the display device with a touch detection function 1 can relieve constraints on the arrangement pitch TDLd due to the width RD1 of the lens column Rd1.

Here, the first substrate 51 corresponds to a specific example of the "first substrate" in the present disclosure. The second substrate 52 corresponds to a specific example of the "second substrate" in the present disclosure. The first electrode 61 corresponds to a specific example of the "first electrode" in the present disclosure. The second electrode 62 corresponds to a specific example of the "second electrode" in the present disclosure. The liquid crystal layer 53 corresponds to a specific example of the "variable focus layer" in the present disclosure. The liquid crystal lens 50 corresponds to a specific example of the "variable focus lens unit" in the present disclosure. The display region Ad corresponds to a specific example of the "display region" in the present disclosure. The display unit 20 corresponds to a specific example of the "display unit" in the present disclosure. The touch detection electrode TDL corresponds to a specific example of the "touch detection electrode" in the present disclosure. The drive electrode COML corresponds to a specific example of the "drive electrode" in the present disclosure. The touch detection unit 40 corresponds to a specific example of the "touch detection unit" in the present disclosure. The liquid crystal layer 23 corresponds to a specific example of the "display function layer" in the present disclosure.

Outline of Entire Operation

Figure 15:
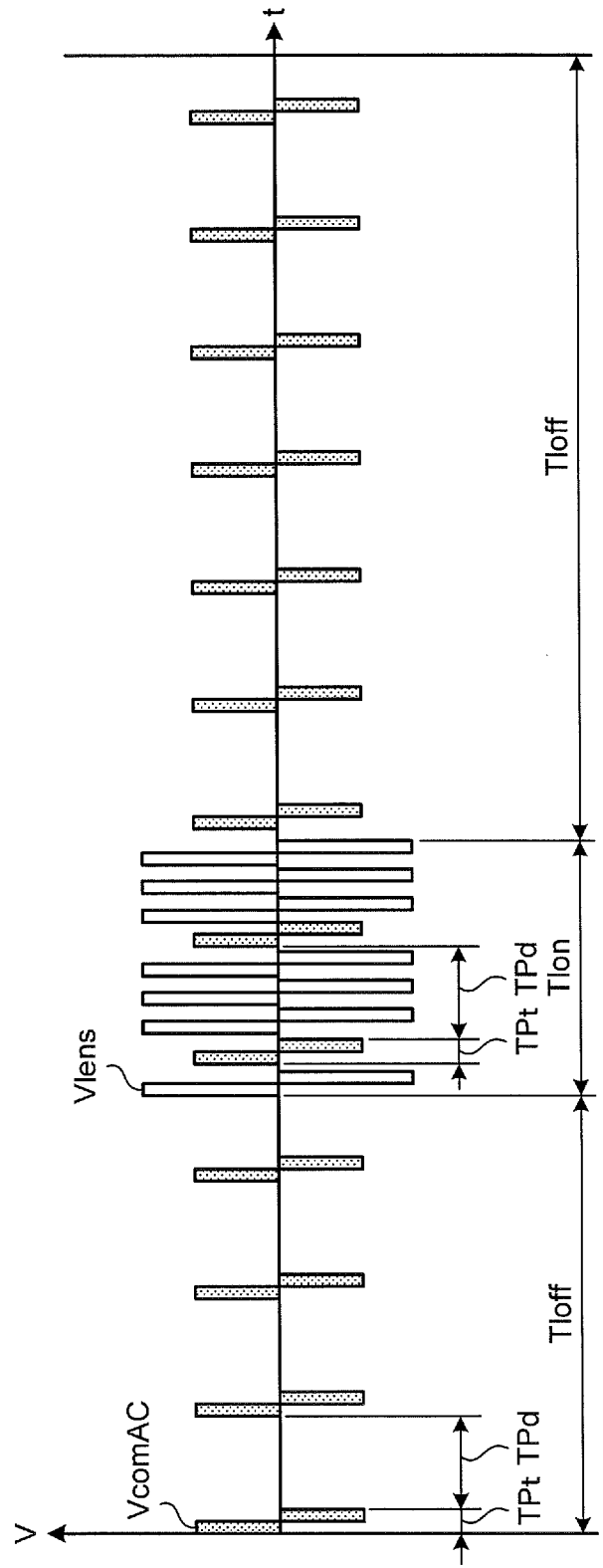
FIG. 15 is an explanatory diagram illustrating an example of a relation between the driving signal for touch detection and drive of the liquid crystal lens according to the first embodiment.

The following describes an operation and an effect of the display device with a touch detection function 1 in the first embodiment. FIG. 15 is an explanatory diagram illustrating an example of a relation between the driving signal for touch detection and drive of the liquid crystal lens according to the first embodiment. The drive electrode COML according to the first embodiment functions as the common drive electrode of the display unit 20 and also as the drive electrode of the touch detection device 30, so that driving signals VcomAC may influence each other. Accordingly, the driving signal Vcom is applied to the drive electrode COML separately in a display period TPd in which display operation is performed and a touch detection period TPt in which touch detection operation is performed. In the display period TPd in which display operation is performed, the drive electrode driver 14 applies the driving signal Vcom as a display driving signal. In the touch detection period TPt in which touch detection operation is performed, the drive electrode driver 14 applies the driving signal Vcom as a touch driving signal. In the following description, the driving signal Vcom serving as a display driving signal may be described as a display driving signal Vcom, and the driving signal Vcom serving as a touch driving signal may be described as a touch driving signal VcomAC.

The control unit 11 illustrated in FIG. 1 supplies a control signal to each of the gate driver 12, the source driver 13, the drive electrode driver 14, the lens control driver 15, and the touch detection unit 40 based on the video signal Vdisp supplied from the outside, and controls them to operate in synchronization with each other. The gate driver 12 supplies a scanning signal Vscan to the display unit 20 in the display period TPd to sequentially select one horizontal line to be a display driving target. The source driver 13 supplies the pixel signal Vpix to each pixel Pix included in the horizontal line selected by the gate driver 12 in the display period TPd.

In the display period TPd, the drive electrode driver 14 applies the display driving signal Vcom as a common potential. In the touch detection period TPt, the drive electrode driver 14 sequentially applies a touch driving signal VcomAC having a frequency higher than that of the common potential to the drive electrode block corresponding to the touch detection operation, and sequentially selects each detection block. In the display period TPd, the display unit with a touch detection function 10 performs display operation based on the signals supplied from the gate driver 12, the source driver 13, and the drive electrode driver 14. In the touch detection period TPt, the display unit with a touch detection function 10 performs touch detection operation based on the signal supplied from the drive electrode driver 14, and outputs the touch detection signals Vdet from the touch detection electrodes TDL. The amplifier 42 amplifies and outputs the touch detection signals Vdet. The A/D convertor 43 converts analog signals output from the amplifier 42 to digital signals at a timing synchronized with the touch driving signal VcomAC. The signal processor 44 is configured to detect whether or not the touch detection device 30 is touched based on the output signals from the A/D convertor 43. When the touch is detected by the signal processor 44, the coordinate extractor 45 obtains touch panel coordinates thereof.

Specific Operation

The following describes a specific operation of the display device with a touch detection function 1. The control unit 11 controls the lens control driver 15 with the lens driving signal V3d to three-dimensionally display an image based on the video signal Vdisp supplied from the outside. As illustrated in FIG. 15, the liquid crystal lens 50 controls a lens voltage Vlens based on the lens driving signal V3d in a variable focus period Tlon. The control unit 11 controls the lens control driver 15 to two-dimensionally display an image based on the video signal Vdisp supplied from the outside. As illustrated in FIG. 15, the liquid crystal lens 50 performs control not to apply the lens voltage Vlens based on the lens driving signal V3d in a fixed focus period Tloff.

In the fixed focus period Tloff illustrated in FIG. 15, the display period TPd in which the display operation is performed and the touch detection period TPt in which the touch detection operation is performed are alternately processed. If the touch detection period TPt is ended in a shorter time than a response time in which the liquid crystal molecules 53LC in the liquid crystal lens 50 make a response, it is possible to reduce influence from the touch driving signal VcomAC on the liquid crystal molecules 53LC of the liquid crystal lens 50. The touch detection period TPt is, for example, shorter than 300 ms. In the touch detection period TPt, the above-described alternating-current (AC) rectangular wave Sg is applied multiple times (for example, dozens of times) as the touch driving signal VcomAC. An effective voltage V of the touch driving signal VcomAC is smaller than a liquid crystal response effective voltage value at which the liquid crystal molecules 53LC in the liquid crystal lens 50 make a response. Accordingly, in the fixed focus period Tloff, the possibility is reduced that the lens surface Lref is formed with the liquid crystal molecules 53LC due to unintended behavior of the liquid crystal molecules 53LC of the liquid crystal lens 50, and thereby the liquid crystal layer 53 will change the refractive index of transmitted light in accordance with the lens voltage.

In the variable focus period Tlon illustrated in FIG. 15, the display period TPd in which the display operation is performed and the touch detection period TPt in which the touch detection operation is performed are alternately processed. As described above, the lens control driver 15 applies the lens driving voltage Vlens corresponding to the lens driving signal V3d to the second electrode 62. The liquid crystal molecules 53LC in the liquid crystal lens 50 changes the refractive index of transmitted light in accordance with the effective voltage value of the lens driving voltage Vlens. In the variable focus period Tlon illustrated in FIG. 15, in the display device with a touch detection function 1 according to the first embodiment, when the touch driving signal VcomAC is applied to the second electrode 62, the lens driving voltage Vlens is not applied thereto. In the display device with a touch detection function 1 according to the first embodiment, when the lens driving voltage Vlens is applied to the second electrode 62, the touch driving signal VcomAC is not applied thereto.

Figure 16:
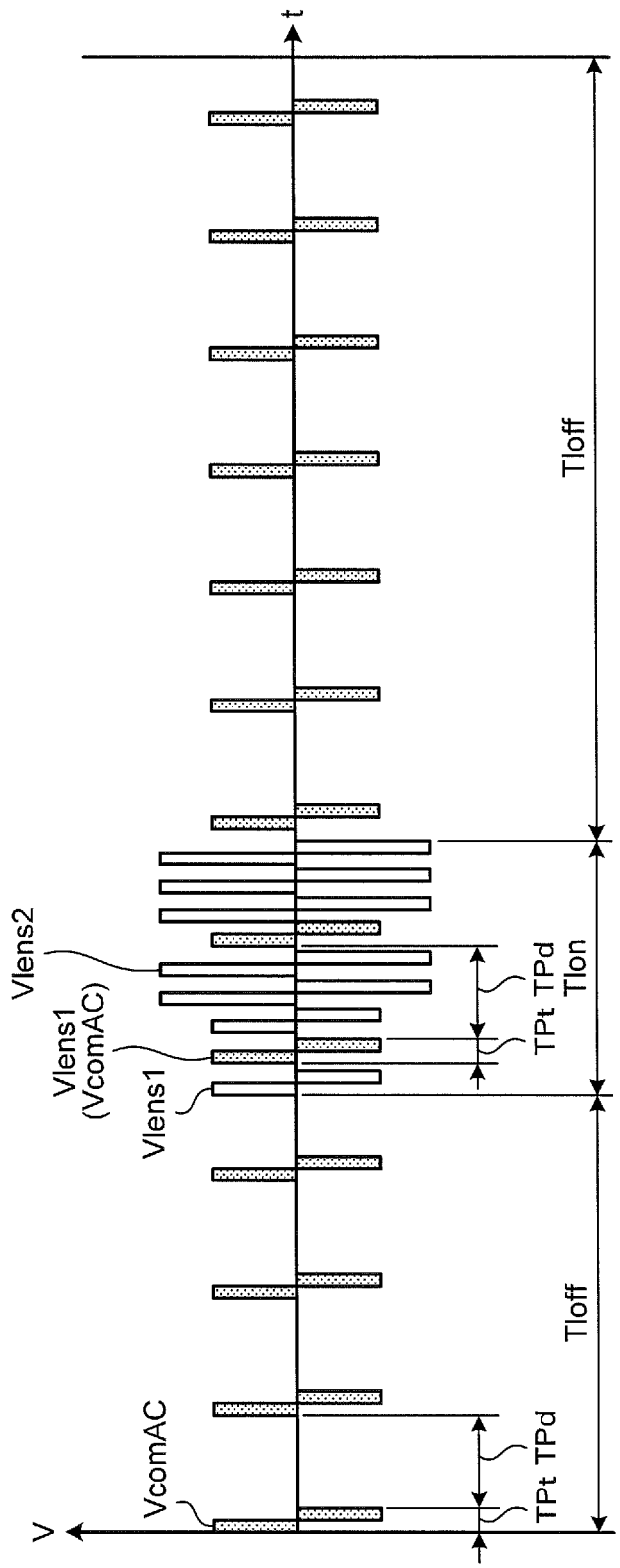
FIG. 16 is an explanatory diagram illustrating another example of the relation between the driving signal for touch detection and the drive of the liquid crystal lens according to the first embodiment.

FIG. 16 is an explanatory diagram illustrating another example of the relation between the driving signal for touch detection and the drive of the liquid crystal lens according to the first embodiment. As illustrated in FIG. 16, in the display device with a touch detection function 1 according to the first embodiment, the touch driving signal VcomAC and a lens driving voltage Vlens1 may be applied at the same timing. For example, even when the touch driving signal VcomAC and the lens driving voltage Vlens1 are applied at the same time, the above-described AC rectangular wave Sg is applied multiple times (for example, dozens of times) to the drive electrode COML and therefore the touch detection unit 40 can detect the touch detection signal Vdet from the second electrode 62 serving as the detection electrode TDL. The lens control driver 15 may apply the lens driving voltage by causing it to be changed from the lens driving voltage Vlens1 to the lens driving voltage Vlens2 in accordance with the lens driving signal V3d.

As described above, the display device with a touch detection function 1 according to the first embodiment includes the liquid crystal lens 50, the display unit 20 that displays an image via the liquid crystal lens 50, and the touch detection unit 40 configured to detect the position of a proximity object. The liquid crystal lens 50 includes the first substrate 51 including the first electrode 61, the second substrate 52 including the second electrode 62, and the liquid crystal layer 53 that is provided between the first electrode 61 side of the first substrate 51 and the second electrode 62 side of the second substrate 52 and in which the refractive index of transmitted light varies depending on the lens driving voltage Vlens applied between the first electrode 61 and the second electrode 62. The display device with a touch detection function 1 according to the first embodiment includes the drive electrode COML that is arranged in the display unit 20 and divided into a plurality of pieces. In the display device with a touch detection function 1 according to the first embodiment, the second electrode 62 among the first electrode 61 and the second electrode 62 is the touch detection electrode TDL. The second electrode 62 is divided into a plurality of electrode patterns 62E1, 62E2, 62E3, 62E4, 62E5, 62E6, 62E7. The touch detection electrode TDL according to the first embodiment is the electrode patterns 62E1 and 62E2 among the electrode patterns 62E1, 62E2, 62E3, 62E4, 62E5, 62E6, 62E7 . . . . The touch detection electrode TDL may be all of the electrode patterns 62E1, 62E2, 62E3, 62E4, 62E5, 62E6, 62E7 . . . .

The touch detection unit 40 can detect whether or not the touch detection device 30 is touched (a contact state or a proximity state) based on the touch detection signal Vdet supplied from the touch detection electrode TDL, and obtain coordinates of touched point in the touch detection region when the touch is detected. In the display device with a touch detection function 1 according to the first embodiment, the second electrode 62 among the first electrode 61 and the second electrode 62 is the touch detection electrode TDL. The touch detection electrode TDL may be the first electrode 61.

In the display device disclosed in JP-A-2012-198416 described above, a touch detection electrode is arranged on a surface of one substrate, and a drive electrode is arranged on a back surface thereof. In contrast, in the display device with a touch detection function 1 according to the first embodiment, even if the touch detection electrode TDL is not formed on the surface of the second substrate 52 after the first substrate 51 is stuck to the second substrate 52, the second electrode 62 can be used as the touch detection electrode TDL. Accordingly, the display device with a touch detection function 1 according to the first embodiment can eliminate a process in which the first substrate 51 and the second substrate 52 are further heated after being stuck to each other to form the touch detection electrode TDL, and can prevent a member of the liquid crystal lens 50 from being deteriorated.

1-2. Second Embodiment

Figure 17:
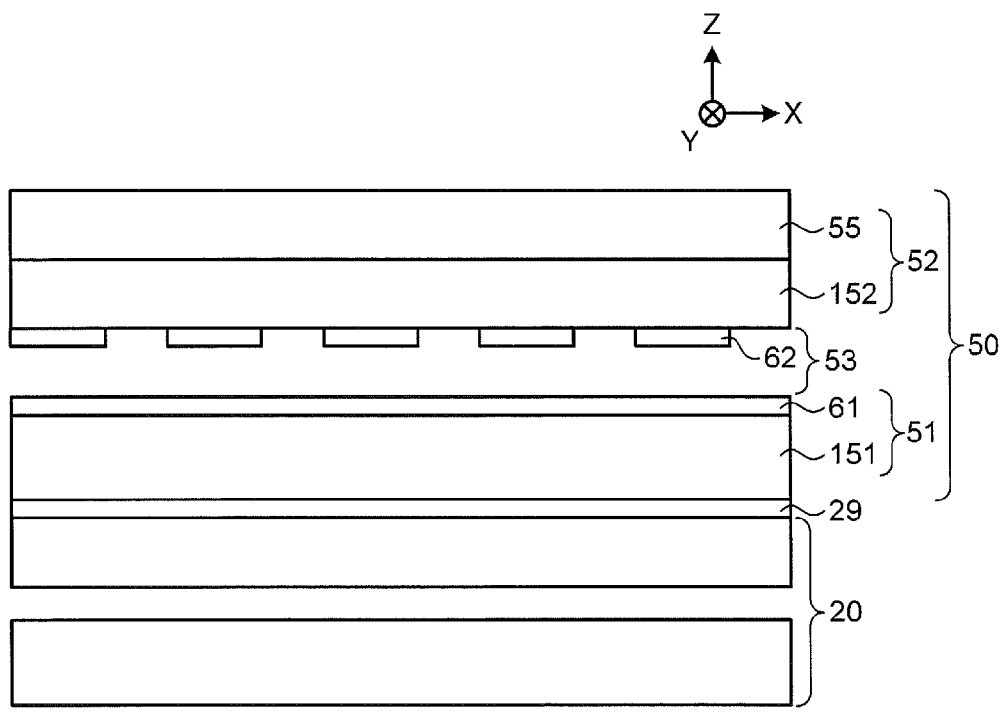
FIG. 17 is a cross-sectional view illustrating a schematic cross-sectional structure of a display device with a touch detection function according to a second embodiment.
Figure 18:
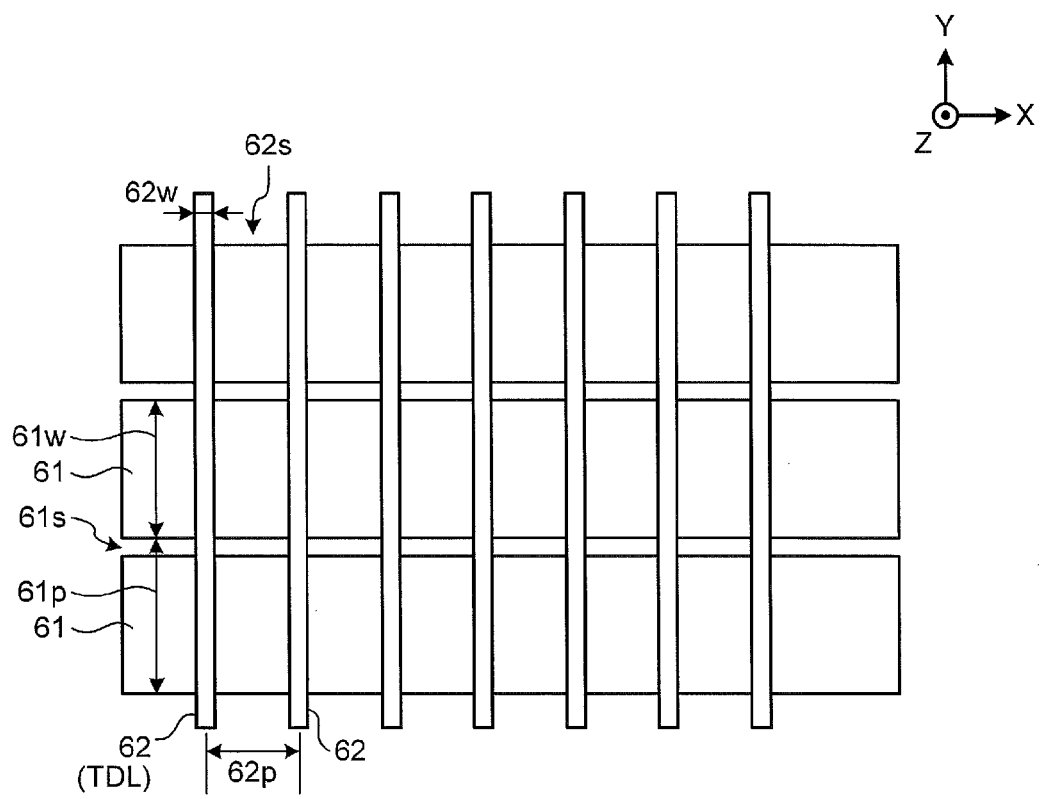
FIG. 18 is an explanatory diagram illustrating an example of a first electrode and a second electrode according to the second embodiment.
Figure 19:
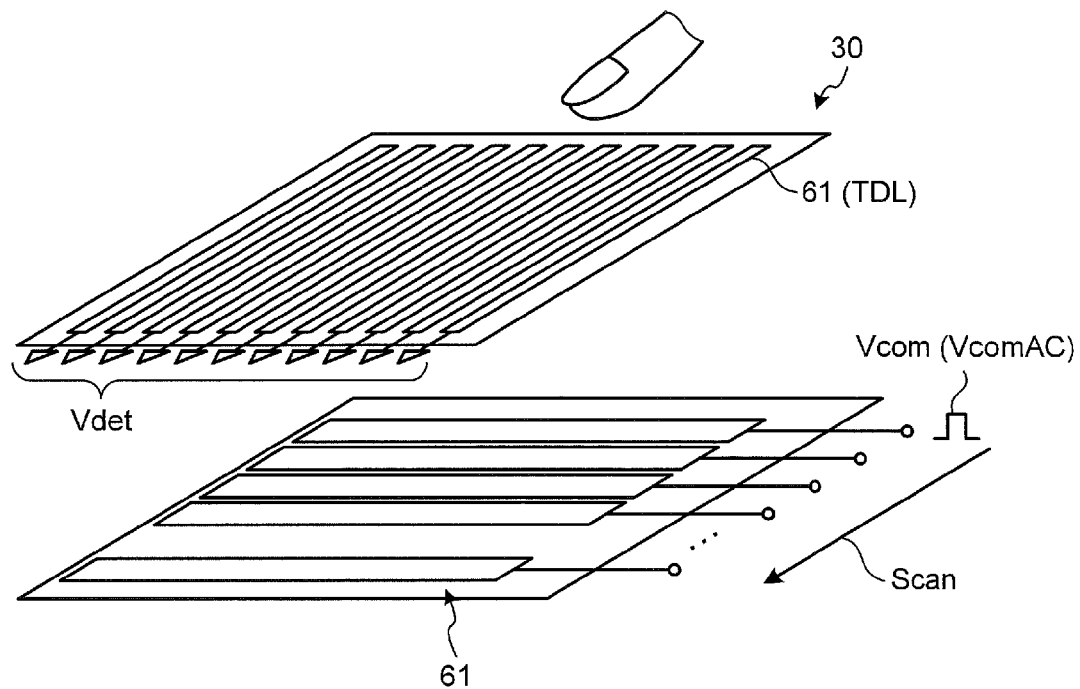
FIG. 19 is a perspective view illustrating a configuration example of drive electrodes and touch detection electrodes of the display device with a touch detection function according to the second embodiment.

The following describes the display device with a touch detection function 1 according to a second embodiment. FIG. 17 is a cross-sectional view illustrating a schematic cross-sectional structure of the display device with a touch detection function according to the second embodiment. FIG. 18 is an explanatory diagram illustrating an example of the first electrode and the second electrode according to the second embodiment. FIG. 19 is a perspective view illustrating a configuration example of a drive electrode and a touch detection electrode of the display device with a touch detection function according to the second embodiment. The same components as those described in the first embodiment are denoted by the same reference numerals, and redundant description will not be repeated. The display device with a touch detection function 1 according to the second embodiment includes the liquid crystal lens 50, and the display unit 20 that displays an image via the liquid crystal lens 50. The liquid crystal lens 50 and the display unit 20 are fixed to each other with a junction layer 29 formed of photo-elastic resin and the like.

In the display device with a touch detection function 1 according to the second embodiment, when one of the first electrode 61 and the second electrode 62 illustrated in FIG. 17 is the touch detection electrode TDL, the other one of the first electrode 61 and the second electrode 62 is the drive electrode. In the second embodiment, the drive electrode COML according to the first embodiment described above functions only as the common drive electrode of the display unit 20. Accordingly, in the second embodiment, the drive electrode COML according to the first embodiment described above does not have to be divided, and may be a solid film.

In the display device with a touch detection function 1 according to the second embodiment, the second electrode 62 among the first electrode 61 and the second electrode 62 illustrated in FIG. 17 is the touch detection electrode TDL, and the other one of the first electrode 61 and the second electrode 62 is the drive electrode. As illustrated in FIG. 18, the first electrode 61 and the second electrode 62 are divided into a plurality of pieces with the slits 61s and 62s, respectively, so that a direction in which one of the first electrode 61 and the second electrode 62 extends differs from a direction in which the other one of the first electrode 61 and the second electrode 62 extends.

The drive electrode driver 14 illustrated in FIG. 1 applies the driving signal VcomAC (touch driving signal VcomAC) to the electrode patterns of the first electrode 61 to drive them in a unit of block including the predetermined number of electrode patterns of the first electrode 61 illustrated in FIG. 18. The touch detection device 30 includes the first electrode 61 and the touch detection electrode TDL of the second electrode 62 that is arranged in a manner opposed to the first electrode 61. Each electrode pattern of the touch detection electrode TDL is coupled to each input of the amplifier 42 in the touch detection unit 40. The electrode patterns of the first electrode 61 and the second electrode 62 intersecting each other form capacitance at each intersection thereof.

With this configuration, when the touch detection operation is performed in the touch detection device 30, the drive electrode driver 14 drives the electrode patterns of the first electrode 61 to perform line-sequential scanning in a time division manner. Accordingly, each one of the detection blocks of the electrode patterns of the first electrode 61 is sequentially selected in a scanning direction Scan. Then the touch detection signal Vdet is output from the electrode patterns of the second electrode 62 each serving as the touch detection electrode TDL. In this way, in the touch detection device 30, touch detection is performed for one detection block. That is, the first electrode 61 corresponds to a drive electrode E1 in a basic principle of the touch detection described above, the second electrode 62 corresponds to a touch detection electrode E2, and the touch detection device 30 performs touch detection according to the detection principle described above. As illustrated in FIG. 19, the electrode patterns intersecting each other constitute the capacitive touch sensors in a matrix. Accordingly, it is possible to detect a position where an external proximity object is in contact with or in proximity to the device by scanning across the entire touch detection surface of the touch detection device 30.

As described above, the display device with a touch detection function 1 according to the second embodiment includes the liquid crystal lens 50, the display unit 20 that displays an image via the liquid crystal lens 50, and the touch detection unit 40 configured to detect the position of a proximity object. The liquid crystal lens 50 includes the first substrate 51 including the first electrode 61, the second substrate 52 including the second electrode 62, and the liquid crystal layer 53 that is provided between the first electrode 61 side of the first substrate 51 and the second electrode 62 side of the second substrate 52 and in which the refractive index of transmitted light varies depending on the lens driving voltage Vlens applied between the first electrode 61 and the second electrode 62. The liquid crystal lens 50 includes the first substrate 51 including the first electrode 61, the second substrate 52 including the second electrode 62, and the liquid crystal layer 53 that is provided between the first electrode 61 side of the first substrate 51 and the second electrode 62 side of the second substrate 52 and in which the refractive index of transmitted light varies depending on the lens driving voltage Vlens applied between the first electrode 61 and the second electrode 62. In the touch detection device 30 (touch panel), when one of the first electrode 61 and the second electrode 62 is the touch detection electrode TDL, the other one of the first electrode 61 and the second electrode 62 is the drive electrode.

1-3. Third Embodiment

Figure 20:
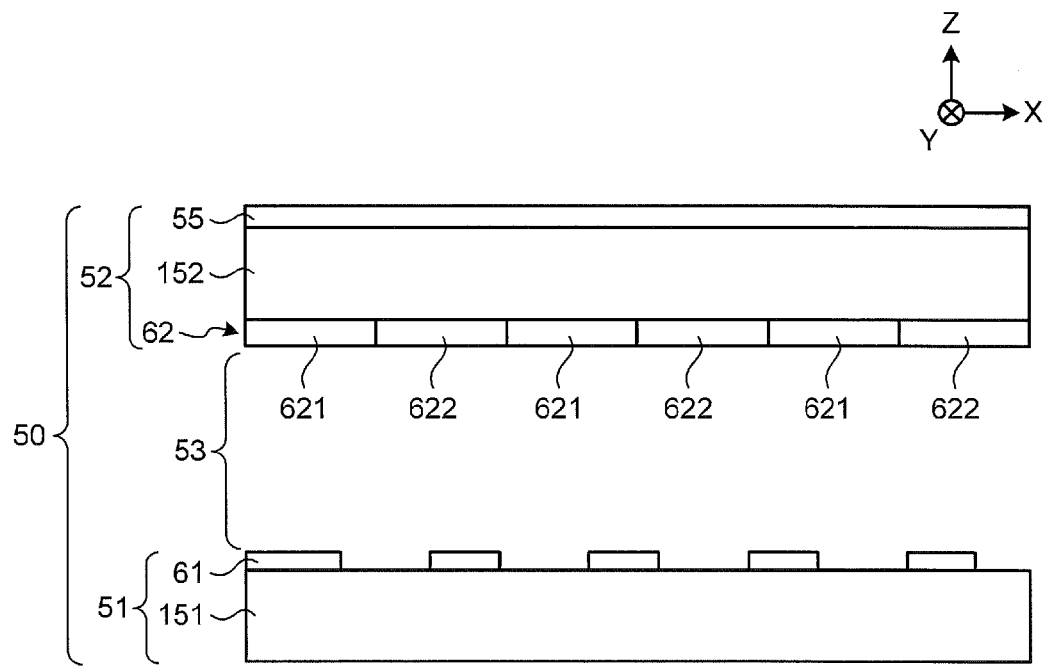
FIG. 20 is a cross-sectional view illustrating a schematic cross-sectional structure of a liquid crystal lens of a display device with a touch detection function according to a third embodiment.
Figure 21:
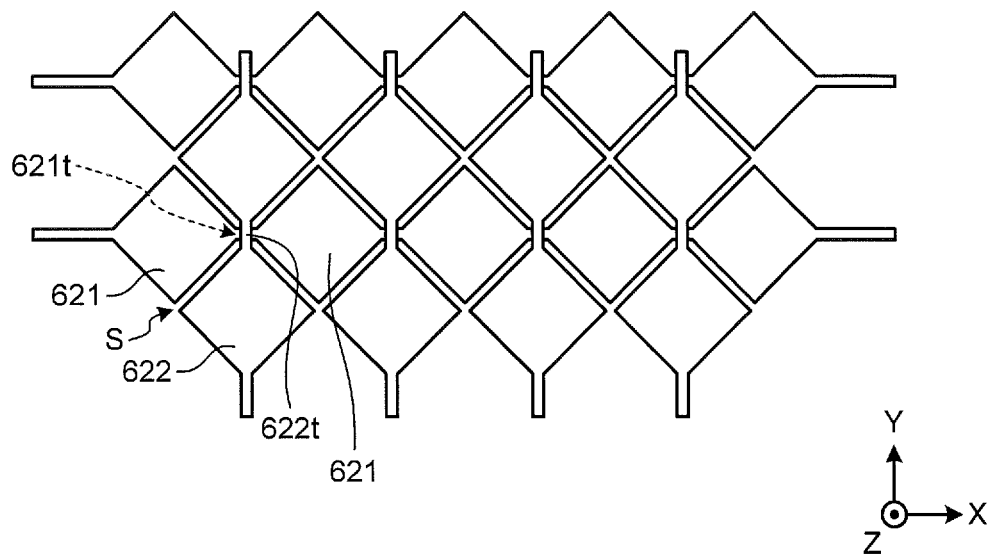
FIG. 21 is an explanatory diagram illustrating an example of a second electrode according to the third embodiment.
Figure 22:
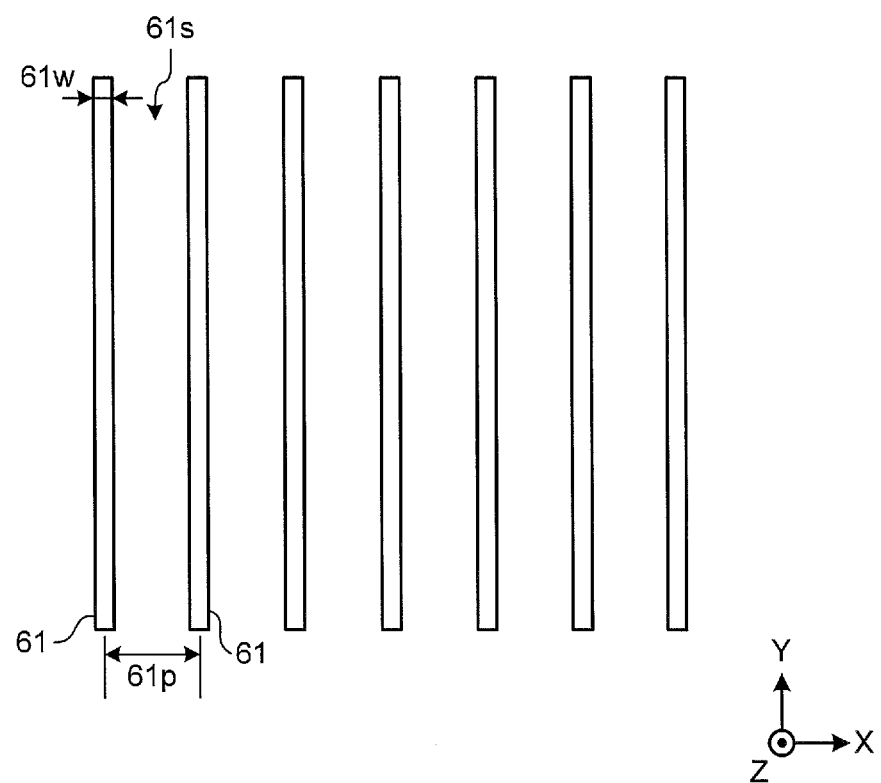
FIG. 22 is an explanatory diagram illustrating an example of a first electrode according to the third embodiment.

The following describes the display device with a touch detection function 1 according to a third embodiment. FIG. 20 is a cross-sectional view illustrating a schematic cross-sectional structure of the liquid crystal lens of the display device with a touch detection function according to the third embodiment. FIG. 21 is an explanatory diagram illustrating an example of the second electrode according to the third embodiment. FIG. 22 is an explanatory diagram illustrating an example of the first electrode according to the third embodiment. The same components as those described in the first and second embodiments are denoted by the same reference numerals, and redundant description will not be repeated.

As illustrated in FIG. 20 and FIG. 21, one of the first electrode 61 and the second electrode 62 is divided into a plurality of pieces by slits S to be conductive patterns 621 and 622 arranged in a matrix in the X-direction and the Y-direction. The first conductive pattern 621 and the second conductive pattern 622 have the same shape, that is, a rectangular shape. The first conductive pattern 621 and the second conductive pattern 622 are alternately arranged in the X-direction and the Y-direction. The first conductive patterns 621 adjacent to each other in the X-direction are coupled to each other via a coupling part 621t, which make a first conductive line in the X-direction, and the first conductive pattern 621 is insulated from the second conductive pattern 622 adjacent thereto in the Y-direction. The second conductive patterns 622 adjacent to each other in the Y-direction are coupled to each other via a coupling part 622t, which make a second conductive line in the Y-direction, and the second conductive pattern 622 is insulated from the first conductive pattern 621 adjacent thereto in the X-direction. Although the coupling part 622t and the coupling part 621t overlap with each other in a direction orthogonal to the surface of the first substrate 51, they are insulated from each other with an insulating member. The touch detection device 30 uses the first conductive pattern 621 as the touch detection electrode TDL and the second conductive pattern 622 as the drive electrode among the first conductive pattern 621 and the second conductive pattern 622 to detect the position of a proximity object. The touch detection device 30 may use the second conductive pattern 622 as the touch detection electrode TDL and the first conductive pattern 621 as the drive electrode among the first conductive pattern 621 and the second conductive pattern 622.

As illustrated in FIG. 22, the first electrode 61 according to the third embodiment is divided by the slits 61s without an electric conductor to be stripe-shaped electrode patterns extending in the Y-direction. The width 61w and the arrangement pitch 61p of the electrode pattern depend on the lens pattern defined by the widths RD1, RD2 . . . of the lens columns Rd described above.

In the variable focus period Tlon, the second electrode 62 can apply the same common potential for variable focus to both of the first conductive pattern 621 and the second conductive pattern 622 more uniformly. Then the lens control driver 15 can finely change the shape of the lens surface Lref by applying the lens driving voltage Vlens corresponding to the lens driving signal V3d to the electrode pattern of the first electrode 61.

1-4. Fourth Embodiment

Figure 23:
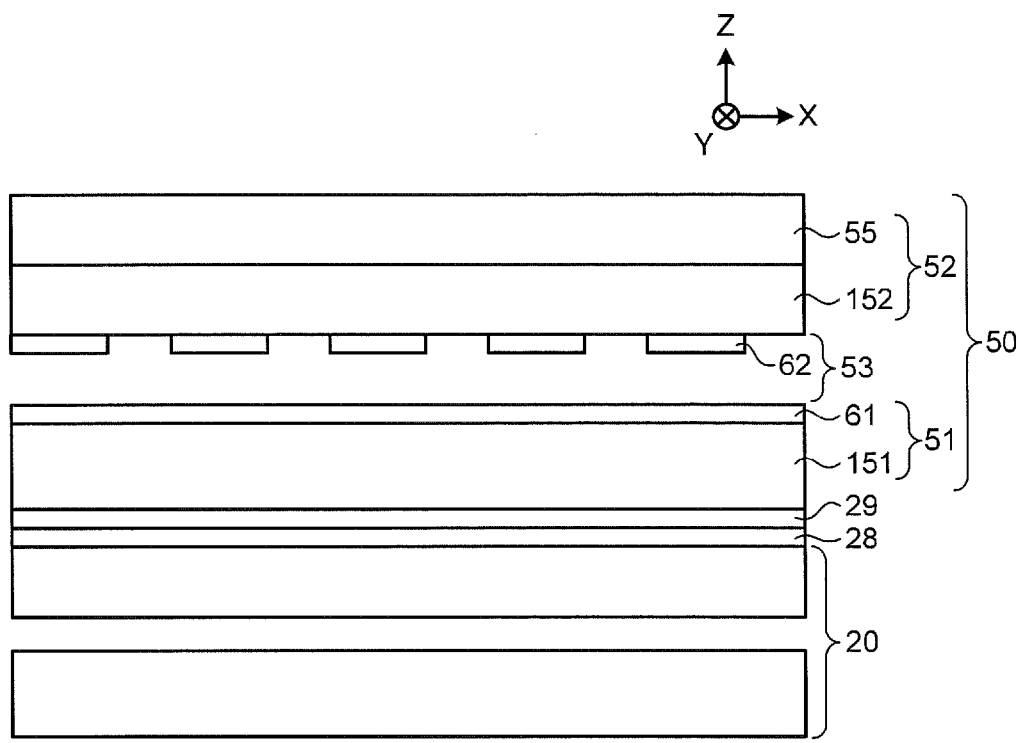
FIG. 23 is a cross-sectional view illustrating a schematic cross-sectional structure of a liquid crystal lens of a display device with a touch detection function according to a fourth embodiment.

The following describes the display device with a touch detection function 1 according to a fourth embodiment. FIG. 23 is a cross-sectional view illustrating a schematic cross-sectional structure of the liquid crystal lens of the display device with a touch detection function according to the fourth embodiment. The same components as those described in the first, second, and third embodiments are denoted by the same reference numerals, and redundant description will not be repeated.

As illustrated in FIG. 23, the display device with a touch detection function 1 according to the fourth embodiment includes the liquid crystal lens 50, and the display unit 20 that displays an image via the liquid crystal lens 50. The liquid crystal lens 50 and the display unit 20 are fixed to each other with the junction layer 29 formed of photo-elastic resin and the like. The liquid crystal lens 50 includes the first substrate 51 including the first electrode 61, the second substrate 52 including the second electrode 62, and the liquid crystal layer 53 that is provided between the first electrode 61 side of the first substrate 51 and the second electrode 62 side of the second substrate 52 and in which the refractive index of transmitted light varies depending on the lens driving voltage Vlens applied between the first electrode 61 and the second electrode 62. The display device with a touch detection function 1 according to the fourth embodiment includes a drive electrode 28 that is arranged at a position opposed to the above-described display region Ad of the display unit 20 and is divided into a plurality of pieces. In the display device with a touch detection function 1 according to the fourth embodiment, the second electrode 62 among the first electrode 61 and the second electrode 62 is the touch detection electrode TDL. In the fourth embodiment, the drive electrode COML according to the first embodiment described above functions only as the common drive electrode of the display unit 20. Accordingly, in the fourth embodiment, the drive electrode COML according to the first embodiment described above does not have to be divided, and may be a solid film.

There is the first electrode 61 between the drive electrode 28 according to the fourth embodiment and the second electrode 62 serving as the touch detection electrode TDL. Accordingly, there is possibility that change in mutual capacitance will be reduced between the drive electrode 28 and the second electrode 62 as the touch detection electrode TDL.

The first electrode 61 according to the fourth embodiment is divided into a plurality of pieces, and extends in a direction parallel to the direction in which the divided drive electrode 28 extends. When the touch detection unit 40 is performing detection, the first electrode 61 is caused to be in the floating state in which the electric potential is not fixed.

Similarly to the operation illustrated in FIG. 10, when the touch detection operation is performed in the touch detection device 30, the drive electrode driver 14 drives one detection block of the drive electrode 28 to perform line-sequential scanning in a time division manner. Accordingly, each one of the detection blocks of the drive electrode 28 is sequentially selected in the scanning direction ScanF.

The first electrode 61 according to the fourth embodiment is in the floating state in which the electric potential is not fixed. Accordingly, each one detection block of the drive electrode 28 that is sequentially selected changes the electric potential of the electrode pattern of the first electrode 61 that overlaps therewith in a direction orthogonal to the first translucent substrate 151, and such a change in the electric potential sequentially occurs in the scanning direction ScanF. As a result, a touch driving signal VcomF synchronized with the touch driving signal Vcom applied to the drive electrode 28 is transmitted to the electrode patterns of the first electrode 61 in the scanning direction ScanF. The drive electrode 28 causes the touch detection electrode TDL to output the touch detection signal Vdet via the electrode pattern of the first electrode 61 to which the touch driving signal VcomF is transmitted. In this way, in the touch detection device 30, touch detection is performed for one detection block. Similarly to the operation illustrated in FIG. 10, the electrode patterns intersecting each other constitute the capacitive touch sensors in a matrix. Accordingly, it is possible to detect a position where an external proximity object is in contact with or in proximity to the device by scanning across the entire touch detection surface of the touch detection device 30.

1-5. Fifth Embodiment

Figure 24:
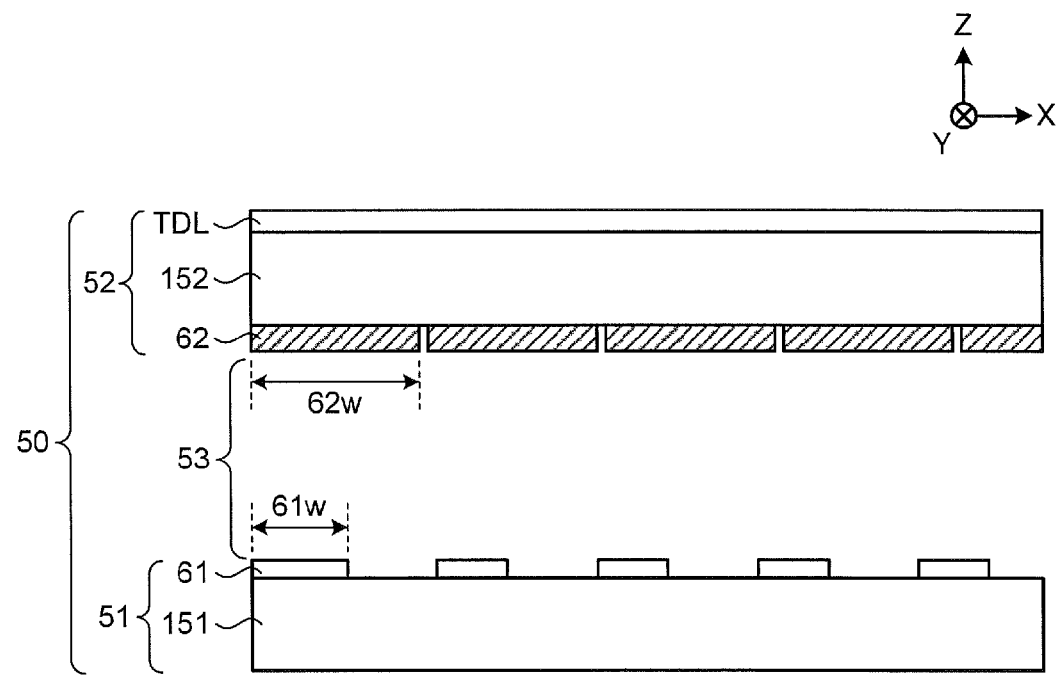
FIG. 24 is a cross-sectional view illustrating a schematic cross-sectional structure of a liquid crystal lens of a display device with a touch detection function according to a fifth embodiment.

The following describes the display device with a touch detection function 1 according to a fifth embodiment. FIG. 24 is a cross-sectional view illustrating a schematic cross-sectional structure of the liquid crystal lens of the display device with a touch detection function according to the fifth embodiment. The same components as those described in the first, second, third, and fourth embodiments are denoted by the same reference numerals, and redundant description will not be repeated.

As illustrated in FIG. 24, the display device with a touch detection function 1 according to the fifth embodiment includes the liquid crystal lens 50 and the display unit 20 that displays an image via the liquid crystal lens 50 described above. The liquid crystal lens 50 includes the first substrate 51 including the first electrode 61, the second substrate 52 including the second electrode 62, and the liquid crystal layer 53 that is provided between the first electrode 61 side of the first substrate 51 and the second electrode 62 side of the second substrate 52 and in which the refractive index of transmitted light varies depending on the lens driving voltage Vlens applied between the first electrode 61 and the second electrode 62.

The display device with a touch detection function 1 according to the fifth embodiment includes the drive electrode COML that is arranged in the display unit 20 and divided into a plurality of pieces. Alternatively, similarly to the second embodiment, one of the first electrode 61 and the second electrode 62 may be the drive electrode. Alternatively, similarly to the fourth embodiment, it may include the drive electrode 28 that is arranged at a position opposed to the above-described display region Ad of the display unit 20 and divided into a plurality of pieces.

The display device with a touch detection function 1 according to the fifth embodiment also includes the touch detection electrode TDL on a surface (back surface) of the second translucent substrate 152 opposing to the surface on which the second electrode 62 is formed.

In the display device with a touch detection function 1 according to the fifth embodiment, the first electrode 61 and the second electrode 62 are divided, and a direction in which the first electrode 61 extends is parallel to a direction in which the second electrode 62 extends. The width of one of the first electrode 61 and the second electrode 62 to which the common potential for variable focus is applied is then enlarged. For example, the width 62w of the second electrode 62 illustrated in FIG. 24 is wider than the width 61w of the first electrode 61. With this structure, the common potential for varying focus is stabilized and accuracy of the lens surface Lref can be enhanced.

When the drive electrode of the touch detection device 30 is the first electrode 61, the extending direction of the first electrode 61 is parallel to the extending direction of the second electrode 62, so that the second electrode 62 is caused to be in the floating state when the touch detection unit 40 performs touch detection. Thus, the second electrode 62 is in the floating state in which the electric potential is not fixed. Accordingly, each one detection block of the electrode pattern of the first electrode 61 that serves as the drive electrode and is sequentially selected in the same direction as illustrated in FIG. 10 changes the electric potential of the electrode pattern of the second electrode 62 that overlaps therewith in a direction orthogonal to the first translucent substrate 151, and such a change in the electric potential sequentially occurs in the scanning direction ScanF. As a result, the touch driving signal VcomF synchronized with the touch driving signal Vcom applied to the electrode patterns of the first electrode 61 is transmitted to the electrode patterns of the second electrode 62 in the scanning direction ScanF. The electrode pattern of the first electrode 61 serving as a drive electrode causes the touch detection electrode TDL to output the touch detection signal Vdet via the electrode pattern of the second electrode 62 to which the touch driving signal VcomF is transmitted. In the touch detection device 30, touch detection is performed for one detection block. Similarly to the operation illustrated in FIG. 10, the electrode patterns intersecting each other constitute the capacitive touch sensors in a matrix. Accordingly, it is possible to detect a position where an external proximity object is in contact with or is in proximity the device by scanning across the entire touch detection surface of the touch detection device 30.

1-6. Modification of Embodiments

Figure 25:
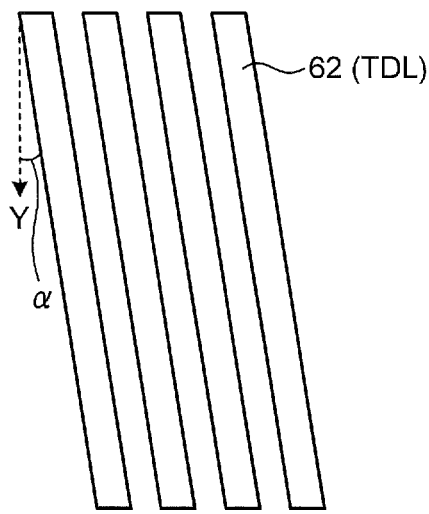
FIG. 25 is a schematic diagram for explaining an extending direction of a first electrode or a second electrode according to a first modification.
Figure 26:
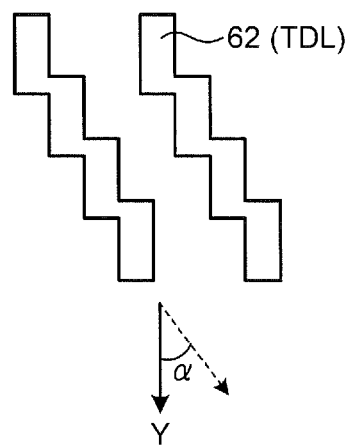
FIG. 26 is a schematic diagram for explaining an extending direction of a first electrode or a second electrode according to a second modification.

The following describes modifications of the first, second, third, fourth, and fifth embodiments. The same components as those described in the first, second, third, fourth, and fifth embodiments are denoted by the same reference numerals, and redundant description will not be repeated. FIG. 25 and FIG. 26 are schematic diagrams for explaining the extending direction of a first electrode or a second electrode according to modifications.

As described above, in the display unit 20, the color regions 32R, 32G, and 32B are associated with the sub-pixels SPix, so that the pixel Pix is configured by the color regions 32R, 32G, and 32B as a set. As illustrated in FIG. 9, the pixels Pix are arranged in a matrix along a direction parallel to the scanning line GCL and a direction parallel to the signal line SGL. The pixels Pix are also arranged so that the same color regions are not adjacent to each other in the direction parallel to the scanning line GCL and the direction parallel to the signal line SGL.

For example, the Y-direction is a direction in which color regions where human visibility is the highest are arranged. A color of the highest human visibility is G (green) among three colors of R (red), G (green), and B (blue). A color of the highest human visibility is W (white) among four colors of R (red), G (green), B (blue), and W (white).

There is possibility that moire will be generated by interference depending on the arrangement of the color regions and the arrangement of the first electrode 61 and the second electrode 62 described above. In a first modification illustrated in FIG. 25, the direction in which the second electrode 62 serving as the touch detection electrode TDL extends is a direction having an angle α with respect to the Y-direction. In a second modification illustrated in FIG. 26, a direction in which the second electrode 62 serving as the touch detection electrode TDL extends in a stepped form is a direction having an angle α with respect to the Y-direction. In this way, the pixels Pix (sub-pixels SPix) are arranged in the display region Ad, at least one of the first electrode 61 and the second electrode 62 is divided into a plurality of conductor patterns, and the extending direction of the conductor patterns traverses part of the pixels Pix and has an angle α with respect to the Y-direction in which the pixels are arranged. Accordingly, at least one of the first electrode 61 and the second electrode 62 extends in the direction having a predetermined angle α with respect to the direction in which the color regions of the highest human visibility are arranged, so that the phenomenon of moire can be suppressed.

Figure 27:
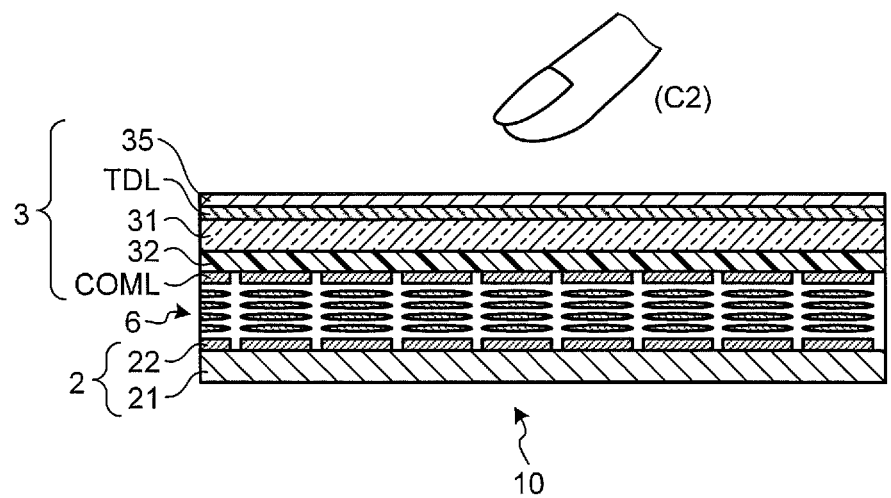
FIG. 27 is a cross-sectional view illustrating a schematic cross-sectional structure of a display device with a touch detection function according to a third modification.

The following describes an example of a schematic cross-sectional structure of a display unit with a touch detection function according a third modification. FIG. 27 is a cross-sectional view illustrating a schematic cross-sectional structure of a display device with a touch detection function according to a third modification. In the display device with the touch detection function 1 according to each of the above-described embodiments, the display unit 20 containing the liquid crystal of a horizontal electric field mode such as an FFS mode or an IPS mode can be integrated with the touch detection device 30 to make the display unit with a touch detection function 10. Instead of such configuration, as the display unit with a touch detection function 10 according to a third modification illustrated in FIG. 27, the touch detection device 30 may be integrated with a touch detection device containing the liquid crystal of a vertical electric field mode such as a twisted nematic (TN) mode, a vertical alignment (VA) mode, and an electrically controlled birefringence (ECB) mode.

2. Application Examples

With reference to FIG. 28 to FIG. 40, the following describes application examples of the display devices with a touch detection function 1 described in the embodiments and the modifications. FIG. 28 to FIG. 40 are diagrams illustrating examples of an electronic apparatus to which the display device with a touch detection function according to any one of the embodiments and the modifications is applied. The display apparatus with a touch detection function 1 according to any one of the embodiments and the modifications can be applied to electronic apparatuses in various fields such as television apparatuses, digital cameras, notebook-type personal computers, portable information devices such as a cellular telephones, and video cameras. In other words, the display apparatus with a touch detection function 1 according to any one of the embodiments and the modifications can be applied to the electronic apparatuses in various fields that display a video signal input from the outside or a video signal generated inside as an image or a video.

Application Example 1

Figure 28:
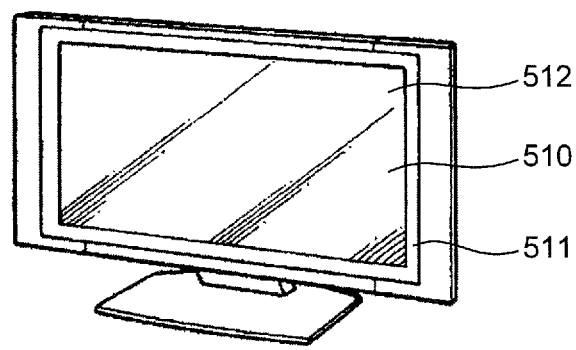
FIG. 28 is a diagram illustrating an example of an electronic apparatus to which the display device with a touch detection function according to any one of the embodiments and the modifications is applied.

An electronic apparatus illustrated in FIG. 28 is a television apparatus to which the display apparatus with a touch detection function 1 according to any one of the embodiments and the modifications is applied. For example, the television apparatus includes a video display screen unit 510 including a front panel 511 and a filter glass 512, and the video display screen unit 510 is the display apparatus with a touch detection function 1 according to any one of the embodiments and the modifications.

Application Example 2

Figure 29:
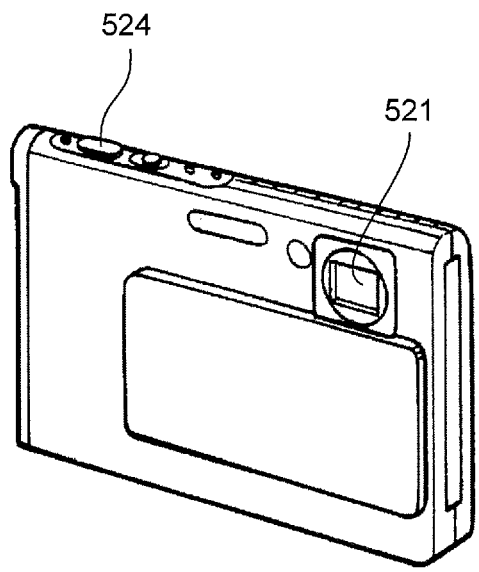
FIG. 29 is a diagram illustrating an example of an electronic apparatus to which the display device with a touch detection function according to any one of the embodiments and the modifications is applied.
Figure 30:
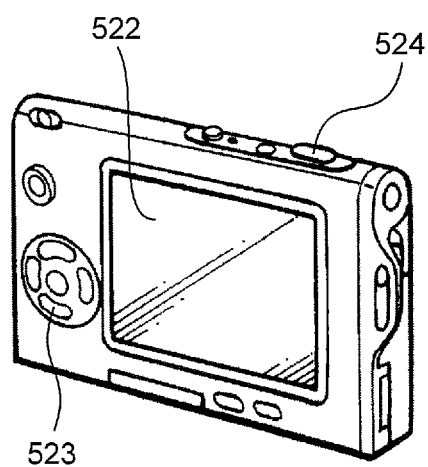
FIG. 30 is a diagram illustrating the example of an electronic apparatus to which the display device with a touch detection function according to any one of the embodiments and the modifications is applied.

An electronic apparatus illustrated in FIG. 29 and FIG. 30 is a digital camera to which any of the display apparatus with a touch detection function 1 according to any one of the embodiments and the modifications is applied. For example, the digital camera includes a flash light emitting unit 521, a display unit 522, a menu switch 523, and a shutter button 524. The display unit 522 is the display apparatus with a touch detection function 1 according to any one of the embodiments and the modifications.

Application Example 3

Figure 31:
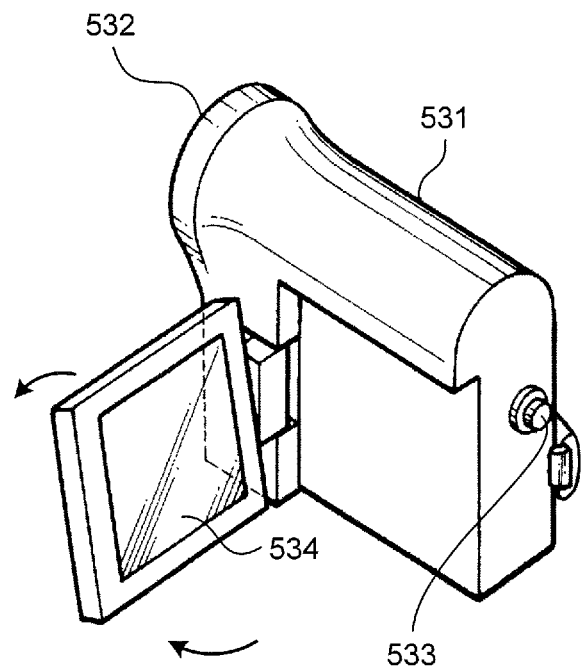
FIG. 31 is a diagram illustrating an example of an electronic apparatus to which the display device with a touch detection function according to any one of the embodiments and the modifications is applied.

An electronic apparatus illustrated in FIG. 31 represents an external appearance of a video camera to which any of the display apparatus with a touch detection function 1 according to any one of the embodiments and the modifications is applied. For example, the video camera includes a main body part 531, a lens 532 for photographing a subject provided at a front side of the main body part 531, a start/stop switch 533 for photography, and a display unit 534. The display unit 534 is the display apparatus with a touch detection function 1 according to any one of the embodiments and the modifications.

Application Example 4

Figure 32:
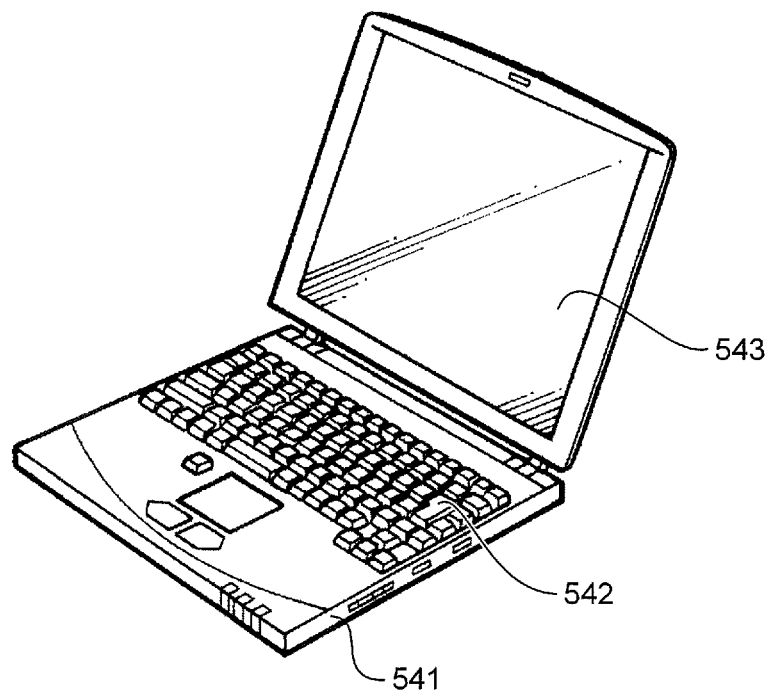
FIG. 32 is a diagram illustrating an example of an electronic apparatus to which the display device with a touch detection function according to any one of the embodiments and the modifications is applied.
Figure 33:
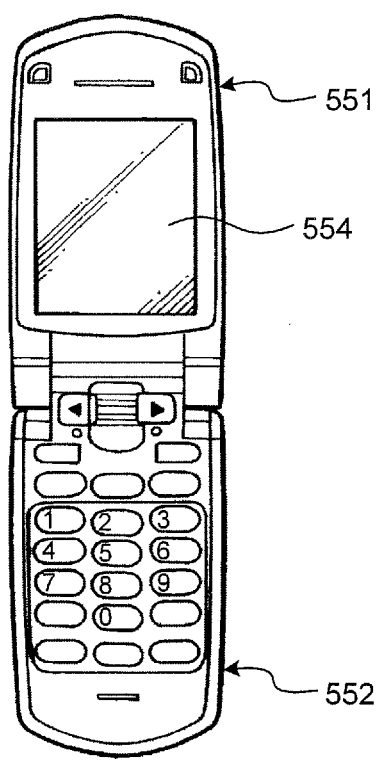
FIG. 33 is a diagram illustrating an example of an electronic apparatus to which the display device with a touch detection function according to any one of the embodiments and the modifications is applied.
Figure 34:
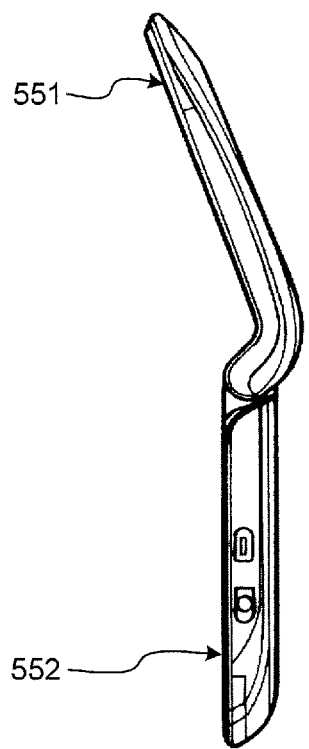
FIG. 34 is a diagram illustrating the example of an electronic apparatus to which the display device with a touch detection function according to any one of the embodiments and the modifications is applied.
Figure 35:
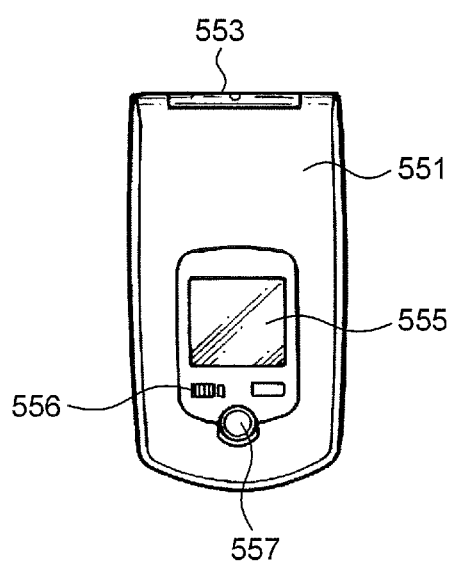
FIG. 35 is a diagram illustrating the example of an electronic apparatus to which the display device with a touch detection function according to any one of the embodiments and the modifications is applied.
Figure 36:
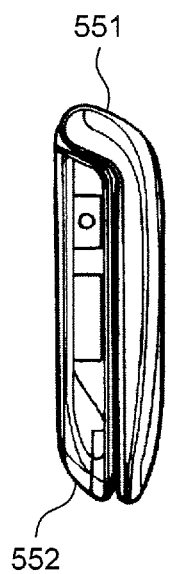
FIG. 36 is a diagram illustrating the example of an electronic apparatus to which the display device with a touch detection function according to any one of the embodiments and the modifications is applied.
Figure 37:
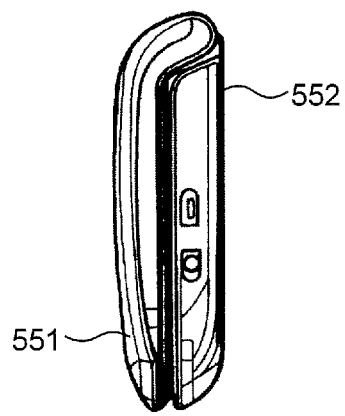
FIG. 37 is a diagram illustrating the example of an electronic apparatus to which the display device with a touch detection function according to any one of the embodiments and the modifications is applied.
Figure 38:
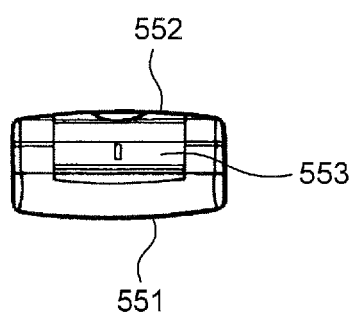
FIG. 38 is a diagram illustrating the example of an electronic apparatus to which the display device with a touch detection function according to any one of the embodiments and the modifications is applied.
Figure 39:
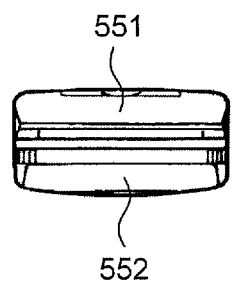
FIG. 39 is a diagram illustrating the example of an electronic apparatus to which the display device with a touch detection function according to any one of the embodiments and the modifications is applied.

An electronic apparatus illustrated in FIG. 32 is a notebook-type personal computer to which any of the display apparatus with a touch detection function 1 according to any one of the embodiments and the modifications is applied. For example, the notebook-type personal computer includes a main body 541, a keyboard 542 for input operation of characters and the like, and a display unit 543 that displays an image. The display unit 543 is the display apparatus with a touch detection function 1 according to any one of the embodiments and the modifications.

Application Example 5

An electronic apparatus illustrated in FIG. 33 to FIG. 39 is a mobile phone to which any of the display apparatus with a touch detection function 1 according to the present embodiments and the display apparatus according to modifications is applied. For example, the mobile phone is made by connecting an upper housing 551 and a lower housing 552 with a connecting part (hinge part) 553, and includes a display device 554, a sub-display device 555, a picture light 556, and a camera 557. Each of the display device 554 and the sub-display device 555 is the display apparatus with a touch detection function 1 according to any one of the embodiments and the modifications.

Application Example 6

Figure 40:
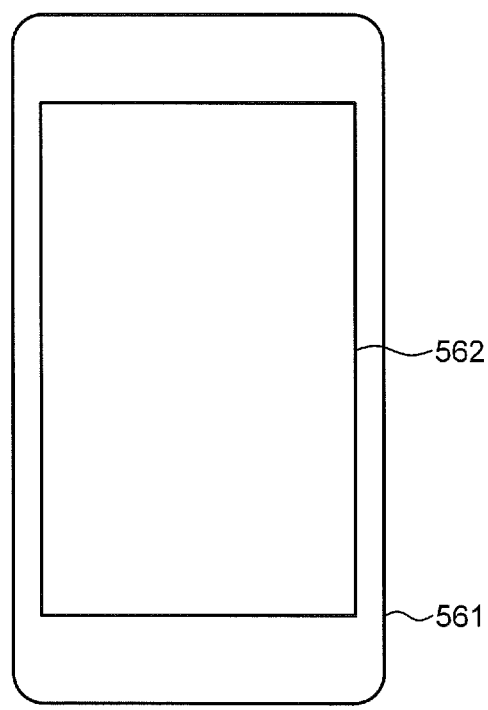
FIG. 40 is a diagram illustrating an example of an electronic apparatus to which the display device with a touch detection function according to any one of the embodiments and the modifications is applied.

An electronic apparatus illustrated in FIG. 40 is a portable information device that operates as a mobile computer, a multifunctional mobile phone, a mobile computer allowing voice communication, or a mobile computer allowing communication, and may be called a smart phone or a tablet device in some cases. For example, the portable information device includes a display unit 562 on a surface of a housing 561. The display unit 562 is the display apparatus with a touch detection function 1 according to any one of the embodiments and the modifications.

3. Aspects of Present Disclosure

The present disclosure includes aspects as follows.

(1) A display device with a touch detection function comprising:
    a variable focus lens unit that includes
        a first substrate including a first electrode,
        a second substrate including a second electrode, and
        a variable focus layer that is provided between the first electrode side of the first substrate and the second electrode side of the second substrate and in which a refractive index of transmitted light varies depending on a certain signal applied between the first electrode and the second electrode;
    a display unit including a display region that displays an image via the variable focus lens unit;
    a drive electrode that is arranged in the display unit or at a position opposed to the display region, and divided into a plurality of pieces; and
    a touch detection unit configured to detect a position of a proximity object using one of the first electrode and the second electrode as a touch detection electrode based on change in capacitance with respect to the drive electrode.

(2) The display device with a touch detection function according to (1), wherein
    a plurality of pixel electrodes are arranged in the display region, and
    the display unit applies a display driving voltage between the pixel electrodes and the drive electrode based on an image signal to exhibit an image display function.

(3) The display device with a touch detection function according to (1), wherein,
    when the touch detection unit is performing detection using one of the first electrode and the second electrode as the touch detection electrode,
    the other one of the first electrode and the second electrode is in a floating state in which an electric potential thereof is not fixed.

(4) The display device with a touch detection function according to (1), wherein,
    when one of the first electrode and the second electrode serves as the touch detection electrode,
    the other one of the first electrode and the second electrode serves as the drive electrode.

(5) The display device with a touch detection function according to (1), wherein
    one of the first electrode and the second electrode that serves as the touch detection electrode is a plurality of divided electrode patterns, and
    part of the electrode patterns that are arranged in a predetermined pitch is coupled to the touch detection unit.

(6) The display device with a touch detection function according to (5), wherein ends of the electrode patterns coupled to the touch detection unit are conductive with each other.

(7) The display device with a touch detection function according to (3), wherein
    a direction in which the one of the first electrode and the second electrode extends differs from a direction in which the other one of the first electrode and the second electrode extends, and
    the direction in which the other one of the first electrode and the second electrode extends is parallel to a direction in which the divided drive electrode extends.

(8) The display device with a touch detection function according to (1), wherein
    one of the first electrode and the second electrode includes a first conductive pattern and a second conductive pattern that are divided into a plurality of pieces and arranged in a matrix, and
    the touch detection unit is configured to detect position of a proximity object using the first conductive pattern as the touch detection electrode and the second conductive pattern as the drive electrode.

(9) The display device with a touch detection function according to (1), wherein
a plurality of pixels are arranged in the display region,
at least one of the first electrode and the second electrode is divided into a plurality of conductor patterns, and
a direction in which the conductor patterns extend traverses part of the pixels and has an angle with respect to a direction in which the pixels are arranged.

(10) The display device with a touch detection function according to (1), wherein the drive electrode is driven with an effective voltage value or less of the certain signal.

(11) The display device with a touch detection function according to (1), wherein the variable focus lens unit switches three-dimensional display and two-dimensional display of the image.

(12) A display device with a touch detection function comprising:
a variable focus lens unit that includes
a first substrate including a first electrode,
a second substrate including a second electrode, and
a variable focus layer that is provided between the first electrode side of the first substrate and the second electrode side of the second substrate and in which a refractive index of transmitted light varies depending on a certain signal applied between the first electrode and the second electrode;
a display unit including a display region that displays an image via the variable focus lens unit;
a drive electrode that is arranged in the display unit or at a position opposed to the display region, and divided into a plurality of pieces;
a touch detection electrode that is divided into a plurality of pieces; and
a touch detection unit configured to detect a position of a proximity object using one of the first electrode and the second electrode as the drive electrode based on change in capacitance between the touch detection electrode and the drive electrode, wherein
each of the first electrode and the second electrode is divided,
a direction in which the first electrode extends is parallel to a direction in which the second electrode extends, and
a width of one of the first electrode and the second electrode to which a common potential for variable focus is applied is enlarged.

(13) An electronic apparatus comprising:
the display device with a touch detection function according to (1).

(14) A touch detection device comprising:
a variable focus lens unit that includes
a first substrate including a first electrode,
a second substrate including a second electrode, and
a variable focus layer that is provided between the first electrode side of the first substrate and the second electrode side of the second substrate and in which a refractive index of transmitted light varies depending on a certain signal applied between the first electrode and the second electrode;
a drive electrode that is divided into a plurality of pieces; and
a touch detection unit configured to detect a position of a proximity object using one of the first electrode and the second electrode as a touch detection electrode based on change in capacitance with respect to the drive electrode, wherein,
when one of the first electrode and the second electrode serves as the touch detection electrode,
the other one of the first electrode and the second electrode serves as the drive electrode.

The electronic apparatus according to the present disclosure includes the display device with a touch detection function described above. Examples of the electronic apparatus according to the present disclosure include, but are not limited to, a television apparatus, a digital camera, a personal computer, a video camera, and a portable electronic apparatus such as a cellular telephone.

The present disclosure provides a display device with a touch detection function and an electronic apparatus including a variable focus layer in which a refractive index of transmitted light varies depending on a certain signal applied between a first electrode and a second electrode, and a touch detection unit configured to detect a position of a proximity object using one of the first electrode and the second electrode as a touch detection electrode.

Alternatively, the present disclosure can provide a display device with a touch detection function and an electronic apparatus that include a variable focus layer in which a refractive index of transmitted light varies depending on a certain signal applied between a first electrode and a second electrode, and a touch detection unit configured to detect a position of a proximity object using one of the first electrode and the second electrode as a drive electrode, to improve detection sensitivity.

What is claimed is:
1. A display device with a touch detection function comprising:
a variable focus lens unit that includes
a first substrate,
a second substrate,
a first electrode included in the first substrate,
a second electrode included in the second substrate, and
a variable focus layer that is provided between the first electrode side of the first substrate and the second electrode side of the second substrate and in which a refractive index of transmitted light varies depending on a certain signal applied between the first electrode and the second electrode to form lenses;
a display unit that is arranged to face the variable focus layer and that includes a display region that displays an image via the variable focus lens unit;
a drive electrode that is divided into a plurality of pieces and that is arranged in the display unit or at a position opposed to the display region, an AC rectangular wave being applied to the drive electrode by an AC signal source; and
a touch detection unit configured to detect a position of a proximity object using one of the first electrode and the second electrode as a touch detection electrode based on a touch detection signal according to a change in capacitance formed between the drive electrode and the touch detection electrode, the touch detection signal being formed based on a current that is generated on the touch detection electrode in response to the AC rectangular wave and is output from the touch detection electrode.

2. The display device with a touch detection function according to claim 1, wherein
a plurality of pixel electrodes are arranged in the display region, and
the display unit applies a display driving voltage between the pixel electrodes and the drive electrode based on an image signal to exhibit an image display function.

3. The display device with a touch detection function according to claim 1, wherein, when the touch detection unit is performing detection using one of the first electrode and the second electrode as the touch detection electrode, the other one of the first electrode and the second electrode is in a floating state in which an electric potential thereof is not fixed, and the other one of the first electrode and the second electrode is arranged between in touch detection electrode and the drive electrode in a direction perpendicular to the forst and second substrates.

4. The display device with a touch detection function according to claim 3, wherein a direction in which the one of the first electrode and the second electrode extends differs from a direction in which the other one of the first electrode and the second electrode extends, and the direction in which the other one of the first electrode and the second electrode extends is parallel to a direction in which the divided drive electrode extends.

5. The display device with a touch detection function according to claim 1, wherein, when one of the first electrode and the second electrode serves as the touch detection electrode, the other one of the first electrode and the second electrode serves as the drive electrode.

6. The display device with a touch detection function according to claim 1, wherein one of the first electrode and the second electrode that serves as the touch detection electrode is a plurality of divided electrode patterns, and part of the electrode patterns that are arranged in a predetermined pitch is coupled to the touch detection unit.

7. The display device with a touch detection function according to claim 6, wherein ends of the electrode patterns coupled to the touch detection unit are conductive with each other.

8. The display device with a touch detection function according to claim 1, wherein one of the first electrode and the second electrode includes a first conductive pattern and a second conductive pattern that are divided into a plurality of pieces and arranged in a matrix, and the touch detection unit is configured to detect position of a proximity object using the first conductive pattern as the touch detection electrode and the second conductive pattern as the drive electrode.

9. The display device with a touch detection function according to claim 1, wherein a plurality of pixels are arranged in the display region, at least one of the first electrode and the second electrode is divided into a plurality of conductor patterns, and a direction in which the conductor patterns extend traverses part of the pixels and has an angle with respect to a direction in which the pixels are arranged.

10. The display device with a touch detection function according to claim 1, wherein the drive electrode is driven with an effective voltage value or less of the certain signal.

11. The display device with a touch detection function according to claim 1, wherein the variable focus lens unit switches three-dimensional display and two-dimensional display of the image.

12. A display device with a touch detection function comprising:

a variable focus lens unit that includes
a first substrate,
a second substrate,
a first electrode included in the first substrate,
a second electrode included in the second substrate, and
a variable focus layer that is provided between the first electrode side of the first substrate and the second electrode side of the second substrate and in which a refractive index of transmitted light varies depending on a certain signal applied between the first electrode and the second electrode to form lenses;

a display unit that is arranged to face the variable focus layer and that includes a display region that displays an image via the variable focus lens unit;

a drive electrode that is divided into a plurality of pieces and that is arranged in the display unit or at a position opposed to the display region, an AC rectangular wave being applied to the drive electrode by an AC signal source;

a touch detection electrode that is divided into a plurality of pieces; and a touch detection unit configured to detect a position of a proximity object using one of the first electrode and the second electrode as a touch detection electrode based on a touch detection signal according to a change in capacitance formed between the touch detection electrode and the drive electrode, a touch detection signal being formed based on a current that is generated on the touch detection electrode in response to the AC rectangular wave and is output from the touch detection electrode, wherein each of the first electrode and the second electrode is divided, a direction in which the frist electrode extends is parallel to a direction in which the second electrode extends, and a width of one of the first electrode and the second electrode to which a common potential for variable focus is applied is enlarged.

13. An electronic apparatus comprising:
the display device with a touch detection function according to claim 1.

14. A touch detection device comprising:
a variable focus lens unit that includes
a first substrate,
a second substrate,
a first electrode included in the first substrate,
a second electrode included in the second substrate, and
a variable focus layer that is provided between the first electrode side of the first substrate and the second electrode side of the second substrate and in which a refractive index of transmitted light varies depending on a certain signal applied between the first electrode and the second electrode to form lenses;

a drive electrode that is divided into a plurality of pieces; an AC rectangular wave being applied to the drive electrode by an AC signal source; and a touch detection unit configured to detect a position of a proximity object using one of the first electrode and the second electrode as a touch detection electrode based on a touch detection signal according to a change in capacitance formed between the drive electrode and the touch detection electrode, the touch detection signal being formed based on a current that is generated on the touch detection electrode in response to the AC rectangular wave and is output from the touch detection electrode, wherein when one of the first electrode and the second electrode serves as the touch detection electrode, the other one of the first electrode and the second electrode serves as the drive electrode.

* * * * *